United States Patent [19]

Ogura

[11] Patent Number: 5,517,489
[45] Date of Patent: May 14, 1996

[54] SYNCHRONOUS DIGITAL HIERARCHY 2-FIBER RING HAVING A SELECTIVE PROTECTION FUNCTION

[75] Inventor: Yutaka Ogura, Kawasaki, Japan

[73] Assignee: Fujitsu Limited, Kanagawa, Japan

[21] Appl. No.: 389,219

[22] Filed: Feb. 15, 1995

[30] Foreign Application Priority Data

Jun. 24, 1994 [JP] Japan ................... 6-143110

[51] Int. Cl.⁶ ................ H04L 12/42; H04L 1/22
[52] U.S. Cl. ................... 370/16.1; 370/85.12
[58] Field of Search ................ 370/13, 16, 160, 370/60.1, 94.1, 94.2, 85.12, 85.13, 85.14; 395/181, 182.02, 182.01, 183.16, 183.17, 183.19

[56] References Cited

U.S. PATENT DOCUMENTS

| | | | |
|---|---|---|---|
| 5,150,356 | 9/1992 | Tsutsui | 370/16.1 |
| 5,179,548 | 1/1993 | Sandesara | 370/16.1 |
| 5,278,824 | 1/1994 | Kremer | 370/16.1 |
| 5,406,401 | 4/1995 | Kremer | 370/16.1 |
| 5,412,652 | 5/1995 | Lu | 370/16.1 |

*Primary Examiner*—Wellington Chin

[57] ABSTRACT

An SDH (synchronous digital hierarchy) 2-fiber ring network optical multiplexing device, which, in order to increase the amount of usable bandwidth when the network is operating normally by selectively limiting the number of protection channels when a communications fault is detected, has opto-electrical converters and electro-optical converters for the purpose of sending and receiving signals on each optical transmission path in two directions, a channel operating section which perform operations on the required channel for the transmitted and received signals, a transmitting/receiving control section which performs transmitting/receiving control of the required channel signals with respect to channel operating section, and an input/output interface section which interfaces signals received from and transmitted to the outside, wherein the transmitting/receiving control section allocates different numbers of channels so as to limit the number of protection channels with respect to the number of working channels on the optical fiber transmission path, thereby increasing the usable bandwidth when the network is operating normally.

17 Claims, 27 Drawing Sheets

Fig.3

| NUMBER OF NODES | NUMBER OF CONNECTION PAIRS | NUMBER OF TIME SLOTS USABLE BETWEEN TWO EXCHANGES (EACH PAIR) (OF THE 63 TIME SLOTS) |
|---|---|---|
| 3 | 3 | 21 |
| 4 | 6 | 10 OR 11 |
| 5 | 10 | 6 OR 7 |

Fig.8
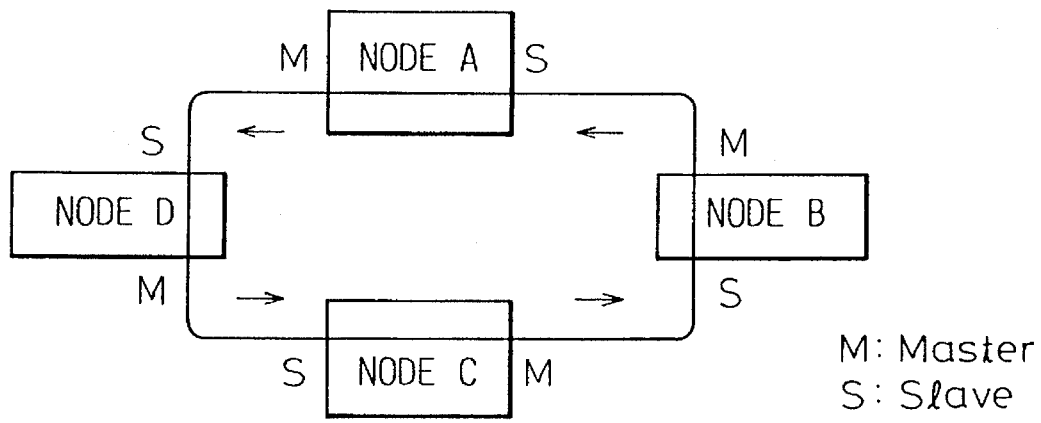
M: Master
S: Slave
Fig.9
| TS # | PRIORITY |
|---|---|
| 1 | 1 |
| 2 | 2 |
| 3 | 2 |
| 4 | 2 |
| 5 | 3 |
| 6 | 3 |
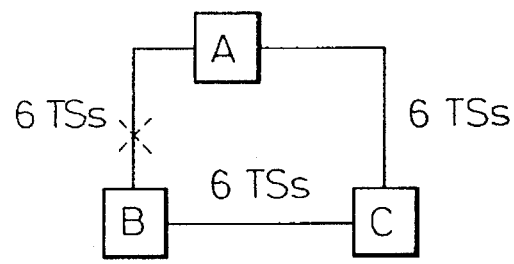
Fig.10
| TS#1 | B | C | A |
|---|---|---|---|
| 1 | ● — | ● ● — | ● |
| 2 | ● — | ● ● — | ● |
| 3 | ● — | ● ● — | ● |
| 4 | ● — | ● ● — | ● |
| 5 | ● —————— | | ● |
| 6 | ● —————— | | ● |

| TS # | PRIORITY | | |
|---|---|---|---|
| | A−B | B−C | C−A |
| 1 | 1 | 1 | 3 |
| 2 | 1 | 2 | 1 |
| 3 | 2 | 2 | 2 |
| 4 | 2 | 3 | 2 |
| 5 | 3 | 3 | 1 |
| 6 | 3 | 3 | 1 |

Fig.29

| TS# | Link #1 | Link #2 | ---- | Link #K | TOTAL (PRIORITY) |
|---|---|---|---|---|---|
| 1 | 5 | 20 |  | 11 | 235 |
| 2 | 2 | 21 |  | 7 | 58 |
| 3 | 12 | 5 |  | 4 | 611 |
| ⋮ |  |  |  |  |  |
| N | 8 | 5 |  | 9 | 36 |

Fig.30

| NUMBER OF PROTECTION TIME SLOTS | | | NUMBER OF WORKING TIME SLOTS (BETWEEN EACH NODE) |
|---|---|---|---|
| A − B | A − B | A − B | |
| 21 (100%) | 21 (100%) | 21 (100%) | 21 |
| 19 (76%) | 19 (76%) | 19 (76%) | 25 |
| 16 (53%) | 17 (56%) | 16 (53%) | 30 |
| 10 (23%) | 10 (23%) | 10 (23%) | 43 (IN THE CASE WHEN m=n) |
| (NOTE) IN CURRENT SYSTEMS: | | | |
| 21 (100%) | 21 (100%) | 21 (100%) | 21 | ns
SYNCHRONOUS DIGITAL HIERARCHY 2-FIBER RING HAVING A SELECTIVE PROTECTION FUNCTION

BACKGROUND OF THE INVENTION

1. Field of the Invention

The present invention relates to an SDH 2-Fiber Ring (synchronous digital hierarchy 2-fiber ring) optical multiplexing device, and more particularly to an SDH 2-Fiber Ring having a function which selectively limits the number of protection channels when a communications fault occurs and increases the usable bandwidth during normal operation.

2. Description of the Related Art

At present, in 2-fiber ring multiplexing devices having a protection function, for all traffic, the transmitting-side node transmits the same data on both the clockwise and the counterclockwise transmission paths, and the receiving-side node uses whichever data is received normally.

In conventional nodes, optical signals are received from the optical fiber transmission path and pass through an opto-electrical converter Which converts the optical signal to an electrical signal, the electrical signal then passing through an electro-optical converter which converts it to an optical signal to be sent onto the optical transmission path, the signals thus passing through the opto-electrical and electro-optical converters. An ADD/DROP multiplexing section extracts time slot signals addressed to the node in question from each of the clockwise and counterclockwise signals, and also inserts time slot signals intended for the transmission destination. A switching section (SW) which selects and outputs the signals of the received signals that were received normally, and an input/output interface section which serves as the interface with an external device such as 2-Mb/s digital dedicated line telephone exchange.

However, in a transmitting-side node such as described above, because the same data is sent over both the clockwise and the counterclockwise ring transmission paths, if the time slots for both the clockwise and the counterclockwise path between a given pair of connected nodes are the same time slot TS#K, for example, the result will be that all TS#K time slots used between each node of the ring network will be reserved.

As a result, when the number of nodes in a conventional ring became large, there was the problem of a great reduction in the number of time slots assigned between each of the nodes.

For example, if 63 time slots are assigned approximately evening between each of the nodes in a ring, the number of time slots that is usable for each connected node pair (channel) with respect to this number of nodes in case of four nodes (A, B, C, and D) is the number of connection pair between the nodes, that is, the six connections node-A-node-B, node-A-node-C, node-A-node-D, node-B-node-C, node-B-node-D, and node-C-node-D. Therefore, in this case the number of time slots that is usable between each of these connection pairs is 63/6, which would be 10 or 11.

SUMMARY OF THE INVENTION

In consideration of the above, an object of the present invention is to provide an SDH 2-fiber ring optical multiplexing device and in particular to provide an SDH 2-fiber ring optical multiplexing device which selectively limits the number of protection channels when a communications fault occurs and thereby increases the usable bandwidth during normal operation.

The present invention provides an SDH 2-fiber ring optical multiplexing device which has a first opto-electrical converter which receives an optical signal from a first optical fiber transmission path which transmits signals in a given direction and converts the signal to an electrical signal, a first channel operating section to which the signal from the first opto-electrical converter is applied and which performs the required operation with respect to the required channel signal of that signal, a first electro-optical converter which converts a signal from the first channel operating section to an optical signal and outputs it to the first optical fiber transmission path, a second opto-electrical converter which receives an optical signal from a second optical fiber transmission path which transmits signals in the direction opposite the above-noted given direction and converts this signal to an electrical signal, a second channel operating section to which the signal from the second opto-electrical converter is applied and which performs the required operation with respect to the required channel signal of that signal, a second electro-optical converter which converts a signal from the second channel operating section to an optical signal and outputs it to the second optical fiber transmission path, a receiving control section which performs channel signal receiving control with respect to the first channel operating section and the second channel operating section whereby control is performed as to which channel signal is to be received from either the first optical fiber transmission path or the second optical fiber transmission path, a transmitting control section which performs channel signal transmitting control with respect to the first channel operating section and the second channel operating section whereby control is performed as to which channel signal is to be transmitted to either the first optical fiber transmission path or the second optical fiber transmission path to send the transmitted signal, an output interface section which externally outputs signals received at the receiving control section, and an input interface section which applies externally input transmitted signal to the transmitting control section.

The above-noted receiving control section and transmitting control section, in performing the above-noted required receiving control and transmitting control, limit the number of protection channels with respect to the number of working channels by assigning a different number of protection channels on the above-noted first optical fiber transmission path and second optical fiber transmission path, thereby providing an SDH 2-fiber ring in which the usable bandwidth is increased when the network is operating normally.

The above-noted first channel operating section and second channel operating section have an ADD/DROP function which performs insertion and extraction of the required channel signal, thereby bringing about channel assignments of a different number of channels which limit the number of protection channels with respect to the number of working channels in the overall ring network. The first channel operating section and second channel operating section also have a cross-connect function which alternately exchanges the above-noted required channel signals, thereby bringing about channel assignments of a different number of channels which limit the number of protection channels with respect to the number of working channels, this being performed independently between each of the nodes on the ring network.

According to the present invention, a priority within the overall ring network is assigned to the time slot of each node on the ring network, the above-noted first channel operating section, second channel operating section, and above-noted receiving control section and transmitting control section causing time slots with a high priority to bump out time slots with a low priority when a transmission fault is detected, so that the time slots with high priority are protected with higher priority. In addition, to each of the time slots of each node on the ring network is assigned a priority between each node, the above-noted first channel operating section and second channel operating section and above-noted receiving control section and transmitting control section causing time slots with a high priority to bump out time slots with a low priority when a transmission fault is detected, so that the time slots with high priority are protected with higher priority.

In addition, according to the present invention, a priority control section is provided which, by observing the traffic in each time slot between each node and in the ring network as a whole, changes these priorities in real time. This priority control section periodically reports the amount of traffic in the time slot of each node to other nodes and updates the priority table which is for the purpose of changing the priorities, and when a given change occurs in the amount of traffic in the time slot said of each node, the amount of traffic in the nodes is reported to the other nodes, so that the priority table is updated to change the priorities, and further when a fault is detected a request is issued to the all other nodes to report the amount of traffic, the response to this request being used as the basis for updating the priority table for the purpose of changing the priorities.

The above-noted priority control section uses the SDH overhead bits to perform reporting between each of the nodes, and uses a dedicated network for communications between nodes to perform communications between the nodes.

Furthermore, according to the present invention, in the communications between two nodes of the SDH 2-fiber ring, a different number of channels are assigned to the clockwise and counterclockwise directions, the number of protection channels assigned being limited, and the number of usable working channels when the network is operating normally being increased. In addition to this, by giving each node a channel or time slot exchanging function (cross-connect function), it is possible to set the number of working channels and associated protection channels independently between each node, thereby enabling an increase in the usable bandwidth when the network is operating normally.

By assigning priority to each time slot in the overall network so that high priority time slots bump lower priority time slots when a fault such as a broken transmission path occurs, high priority time slots are protected with higher priority. A prerequisite for this type of priority protection is that the usable bandwidth available when the network is operating normally be increased. By using the above-noted cross-connect function to perform the above-described priority protection between each node independently, it is possible to achieve an increase in usable bandwidth when the network is operating normally.

In the above-noted "bump-out," as described above, by monitoring the signaling, etc. either for the overall ring network or between each node to verify the associated traffic, the priority of each time slot is changed in real time according to the results of this traffic verification. Therefore, it is possible to achieve flexible and efficient accommodation of an increase in the usable bandwidth when the above network is operating normally. Each node periodically reports the amount of traffic in the time slot associated with the node to all the other nodes, and when a node detects a change such as abnormal change, by reporting the amount of traffic to all the other nodes, the internal priority table is changed. In addition, a node at which a fault is detected issues a request to all other nodes to report the amount of traffic, the response to that request being used as the basis for the updating of the internal priority table by the node at which the fault is detected.

BRIEF DESCRIPTION OF THE DRAWINGS

The present invention will be more clearly understood from the descriptions as set forth below, with reference to the following accompanying drawings.

FIG. 3 is a drawing which shows the number of time slots that can be used for each node connection pair with respect to the total number of nodes, for the case in which 63 time slots are allocated approximately uniformly between each node on a ring.

FIG. 8 is an explanatory drawing which shows the establishment of data flow between each of the nodes on the ring.

FIG. 9 is an explanatory drawing (1) which explains the bump-out function of the embodiment of FIG. 7.

FIG. 10 is an explanatory drawing (2) which explains the bump-out function of the embodiment of FIG. 7.

FIG. 29 is a drawing which shows an example of a traffic management table (priority table).

FIG. 30 is a drawing which shows an example of the relationship between the number of working time slots and the number of protection time slots according to the present invention.

DESCRIPTION OF THE PREFERRED EMBODIMENTS

Figure 1:
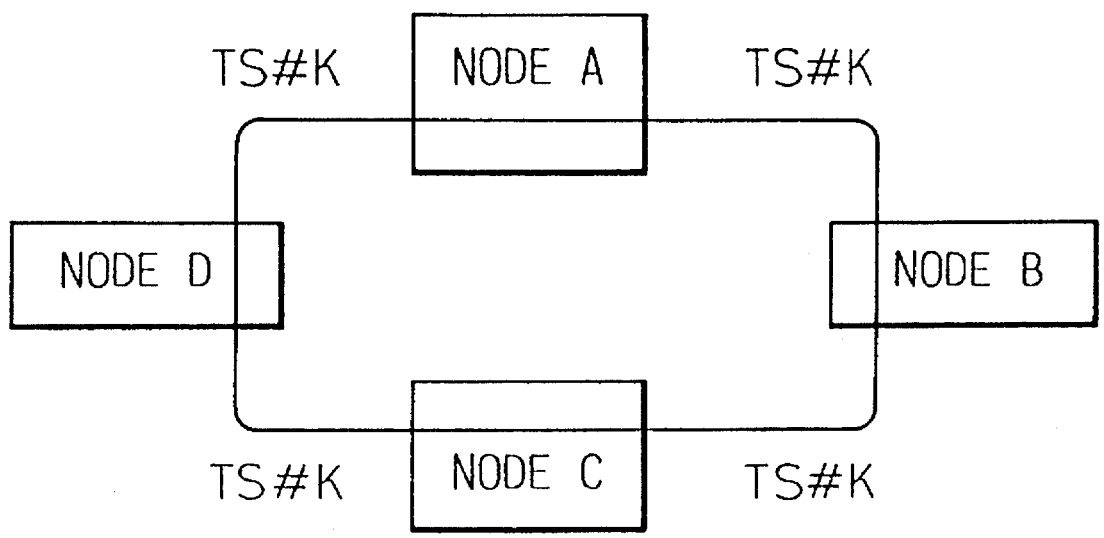
FIG. 1 is a drawing which shows an example of the network configuration of an SDH 2-fiber ring network consisting of four nodes.
Figure 2:
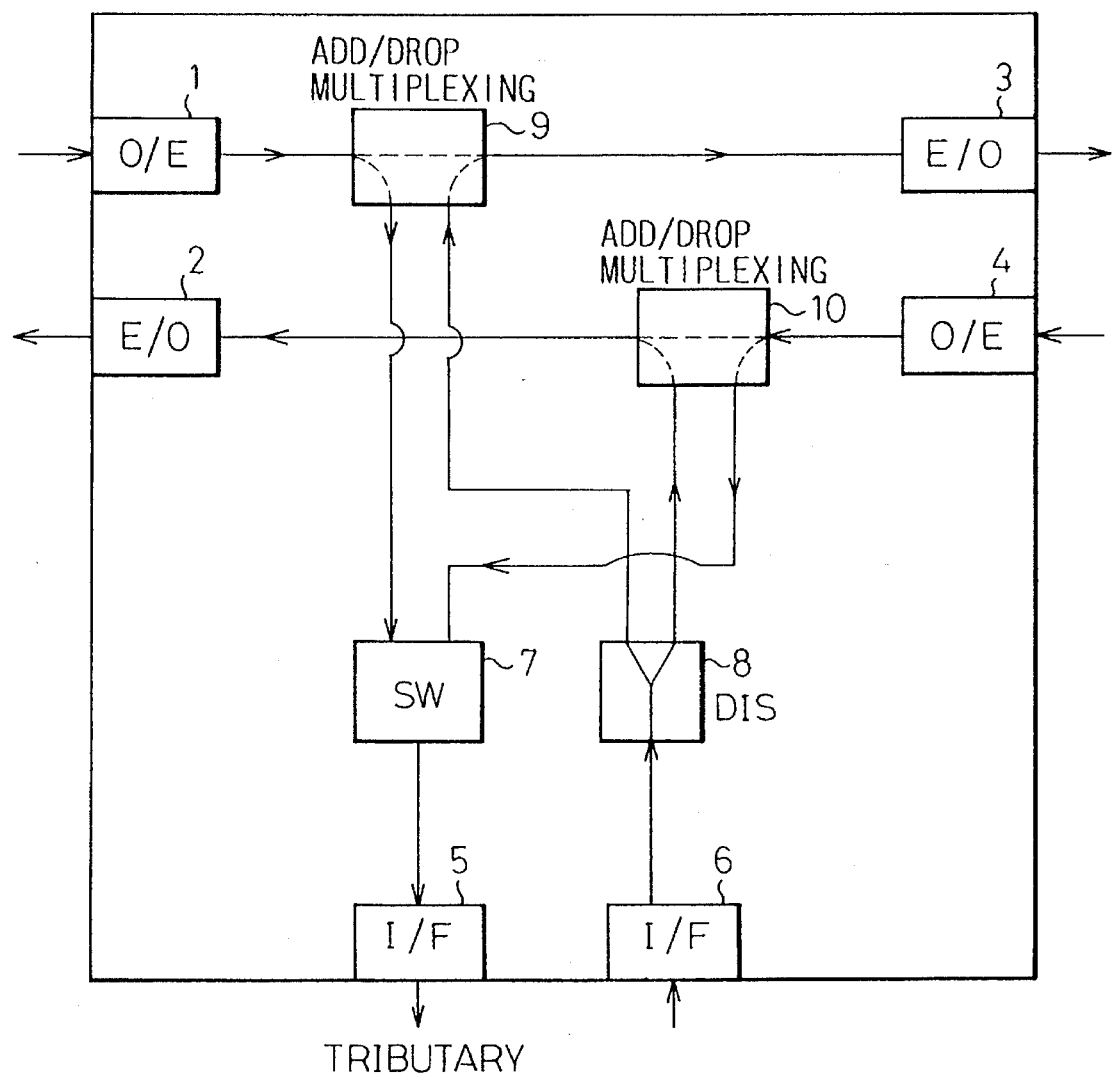
FIG. 2 is a block diagram which shows an example of the node configuration in the prior art shown in FIG. 31.

Before describing the preferred embodiments according to the present invention, examples of the related art are provided, with reference made to FIGS. 1 to 3.

FIG. 1 shows an example of the network configuration of an SDH 2-fiber ring network consisting of four nodes.

In FIG. 1, there are N time slots TS (TIME SLOT) allocated for the purpose of performing communications between the four nodes A, B, C, and D. These time slots will having different allocations, depending upon the various transmission speeds, for example 600 Mb/s or 150 Mb/s, used in the SDH. What follows is an explanation of the case in which there are 63 time slots for 2 Mb/s communications between each node, these being allocated approximately uniformly between each node in a system with an overall transmission speed of 150 Mb/s.

In FIG. 1, the above-described clockwise and counterclockwise directions are not distinguished, the k-th clockwise time slot and the k-th counterclockwise time slot being taken as one set, this set being indicated as the TS#K time slot. When speaking simply of the TS#K time slot, this will not indicate the time slot TS#K between each node, but rather will indicate the TS#K time slot in the ring network as a whole.

That is, this will be the overall name, which refers to the TS#K time slot between node A and node B, the TS#K time slot between node B and node C, the TS#K time slot between node C and node D, and the TS#K time slot between node D and node A as shown in FIG. 1.

Also, in the explanation which follows, the term channel shall be used to refer to the end-to-end connection between each of nodes A, B, C, and D, this being used to indicate the connection pairs between the nodes in the ring.

FIG. 2 shows an example of the node configuration of the prior art shown in FIG. 1.

In FIG. 2, the opto-electrical converters (O/E) 1 and 4 receive optical signals from the optical fiber transmission path and convert these optical signals to electrical signals, and electro-optical converters (E/O) 2 and 3 convert electrical signals to optical signals and send them to the optical fiber transmission path. The time slot signals intended for that local node are extracted from the clockwise and counterclockwise signals received respectively by the opto-electrical converters (O/E) 1 and 4 by the ADD/DROP multiplexing sections 9 and 10. The switching section (SW) 7 selects the normally received signal from the above-noted received signals, and applies this signal to the output interface (I/F) 5. This signal passes through the output interface 5 and is output to an external device, such as a 2-Mb/s dedicated line to a telephone exchange.

In the opposite direction, the signal received via the input interface (I/F) 6 from the above-noted dedicated line passes through the distribution section (DIS) 8 and is applied to the each of above-noted ADD/DROP multiplexing sections 9 and 10. These signals are inserted at these ADD/DROP multiplexing sections into clockwise and counterclockwise open time slots for the transmission destination, are then passed through the above-noted electro-optical converters (E/O) 2 and 3, and are then output as the same inserted data signal to the 20 corresponding respective nodes.

However, when, as described above, the same data is sent on the clockwise and counterclockwise ring transmission paths by a transmitting node, when, for example, both the clockwise and counterclockwise time slots TS#K of connection pair between two nodes are used, all the TS#K time slots on the ring network used by each of the node pairs will be reserved.

For this reason, there was the problem of a great decrease in the number of time slots allocated between each node when the number of nodes in a ring became large.

FIG. 3, as one example of the above-described situation, shows the number of usable time slots allocated for each node connection pair (channel) with respect to the total number of nodes in the case in which 63 time slots are approximately uniformly allocated between each node in the ring.

For example, in the case of FIG. 1, in which there are four nodes (A, B, C, and D), there are the six connection pairs of node-A-node-B, node-A-node-C, node-A-node-D, node-B-node-C, node-B-node-D, and node-C-node-D, and in this case the number of usable time slots, which is 63/6, is 10 or 11.

In the present invention, in an SDH 2-fiber ring optical multiplexing device, in the particular case in which a communications fault occurs, the number of protection channels is selectively limited, thereby making it possible to increase the number of usable time slots allocated when the network is operating normally.

Figure 4:
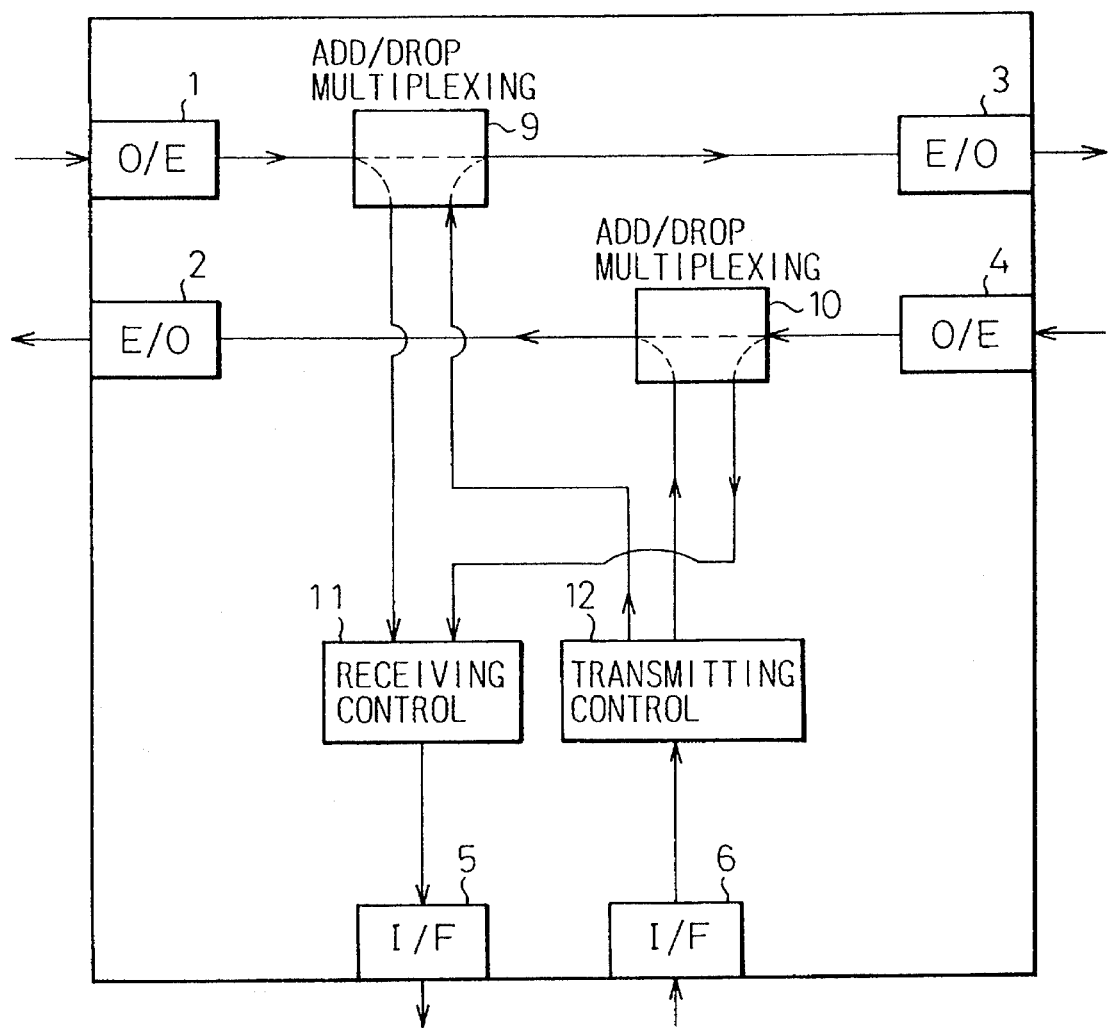
FIG. 4 is a block diagram which shows the basic configuration of an SDH 2-fiber ring optical multiplexing device which has a selective protection function, according to the present invention.

FIG. 4 is a block diagram which shows the basic configuration of an SDH 2-fiber ring optical multiplexing device which has a selective protection function according to the present invention.

In FIG. 4, the same reference symbols have been assigned to elements which correspond to blocks in FIG. 2, and a description of these common elements will not be presented anew herein.

In FIG. 4, in place of the switching section 7 and distribution section 8 of FIG. 2, the receiving control section 11 and transmitting control section 12, respectively, according to the present invention, are used. In contrast to the switching section 7 and distribution section 8, which merely perform physical grouping and distribution of signal lines, the receiving control section 11 and transmitting control section 12 have the function of performing allocation of differing number of channels to the clockwise and counterclockwise directions, which is a feature of the present invention.

For each of the nodes in the ring, when setting the time slot for transmitting or receiving, the time slots for the clockwise and counterclockwise paths are set separately. That is, the above-noted transmitting control section 12 controls on what channel of either the clockwise or counterclockwise transmission path the signal input via the input interface (I/F) 6 is to be transmitted and the above-noted receiving control section 11 controls what signal from either the clockwise or counterclockwise transmission path is to be received and output via the output interface (I/F) 5.

Figure 6:
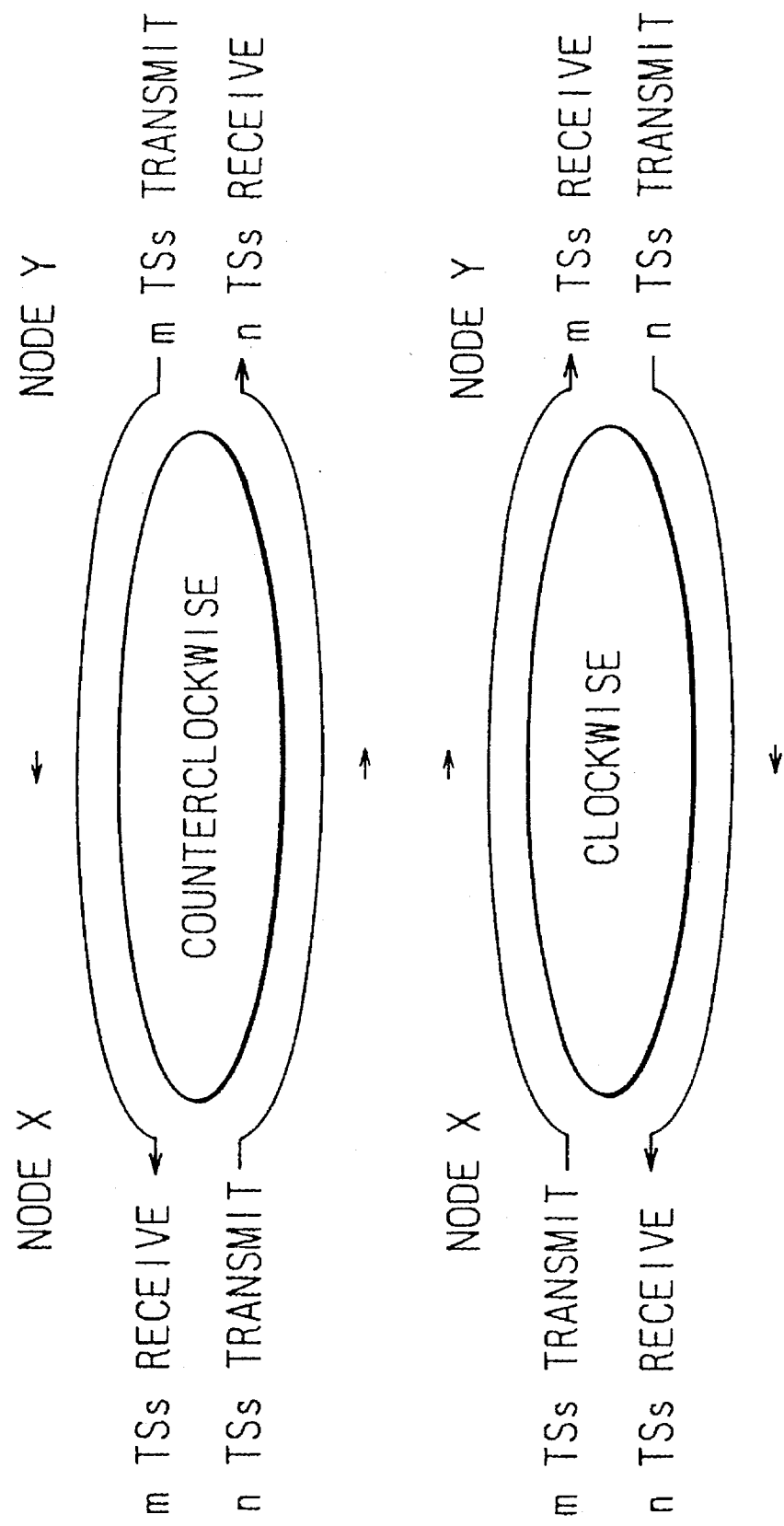
FIG. 6 is an explanatory diagram which illustrates the difference in numbers of time slots in the clockwise direction and the counterclockwise direction in accordance with the transmitting control section and receiving control section of FIG. 4.

FIG. 6 is a drawing which explains the difference in the number of time slots of the clockwise and the counterclockwise paths in accordance with the transmitting control section and receiving control section of FIG. 4.

The upper part of FIG. 6 shows the counterclockwise ring transmission path for communications between node X and node Y, and the lower part of FIG. 6 shows the corresponding clockwise transmission path. Node X is controlled by the above-noted transmitting control section 12 so that it performs signal transmission to node Y in n time slots over the counterclockwise transmission path and so that it performs signal transmission to node Y in m time slots over the clockwise transmission path. Similarly, node X is controlled by the above-noted receiving control section 11 so that performs signal reception from node Y in m time slots over the counterclockwise transmission path and so that it performs signal reception from node Y in n time slots over the clockwise transmission path.

In the above cases, n<m or n>m. Each of the above-noted (n+m) time slots can be either a working time slot or a protection time slot.

With m=n, that is in the case in which the number of zworking time slots is the same as the number of protection time slots, we have the same situation as the above-described conventional systems.

Figure 5:
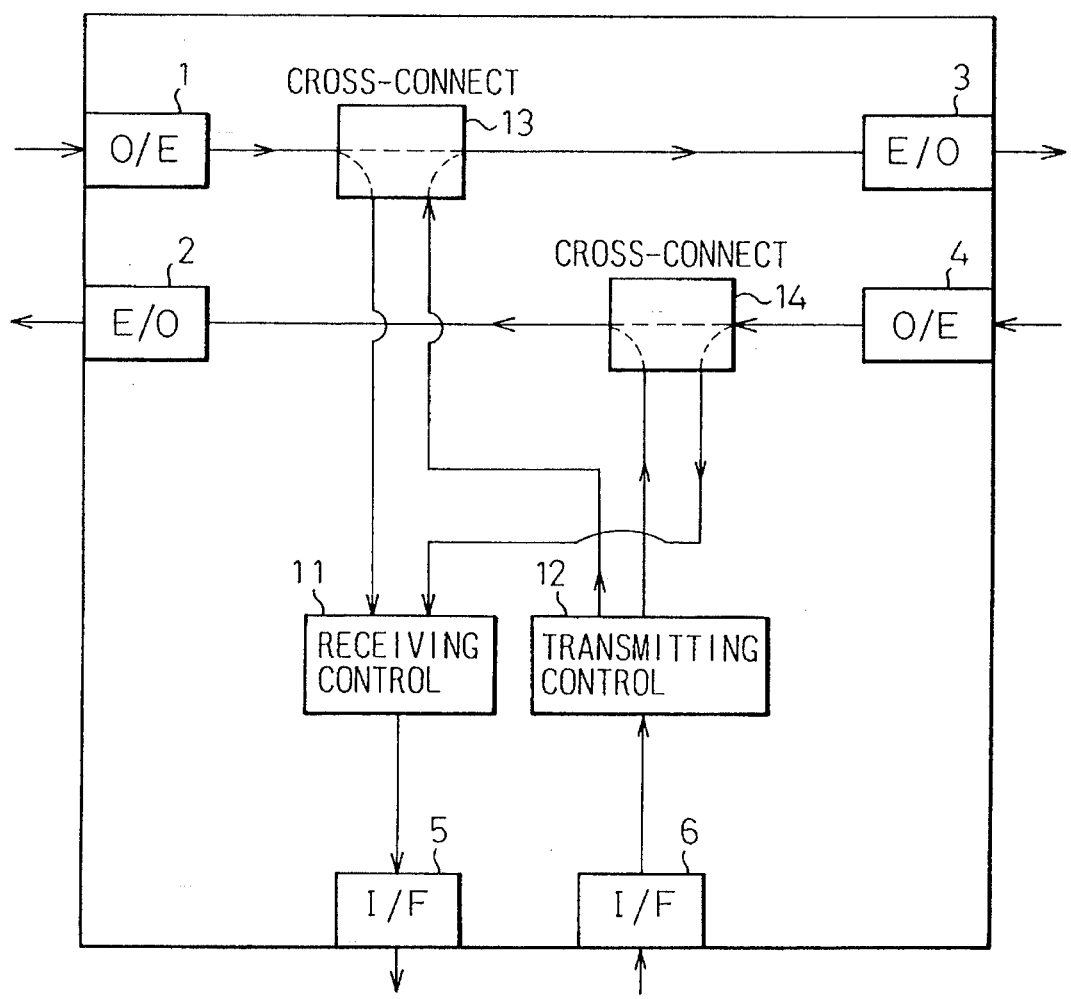
FIG. 5 is a block diagram which shows another basic configuration of an SDH 2-fiber ring optical multiplexing device which has a selective protection function, according to the present invention.

FIG. 5 is a device block diagram which shows another basic configuration of an SDH 2-fiber ring optical multiplexing device having a selective protection function according to the present invention.

In FIG. 5, the same reference symbols have been assigned to elements which correspond to blocks in the above-described FIG. 4, and a description of these common elements will be omitted herein. The difference between FIG. 5 and FIG. 4 is that in FIG. 5 the cross connection sections 13 and 14 are used in place of the ADD/DROP multiplexing sections 9 and 10 of FIG. 4.

In contrast to the ADD/DROP multiplexing sections 9 and 10 of FIG. 4, which merely inserted data into the required time slots or extracted data from the required time slots, the cross connection sections 13 and 14 of FIG. 5 additionally have a time slot interchange function which interchanges data between time slots. With this configuration, as is the case with the configuration of FIG. 4, it is possible by means of the transmitting control section 12 and receiving control section 11 to allocated a different number of channels to the clockwise and counterclockwise directions.

In addition, with this configuration, by means of the above-noted cross-connection function, traffic which is connected through between node X an node Y in FIG. 5, that is, traffic which enters in time slot TS#n and passes through in time slot TS#n, can be exchanged, for example, with traffic which enters in time slot TS#n and passes through in time slot TS#m.

Thus, it is possible to perform flexible re-allocation of time slots after the addition or elimination of time slots, and it is also possible to allocate closed slots to between each of the nodes on the ring network.

Figure 7:
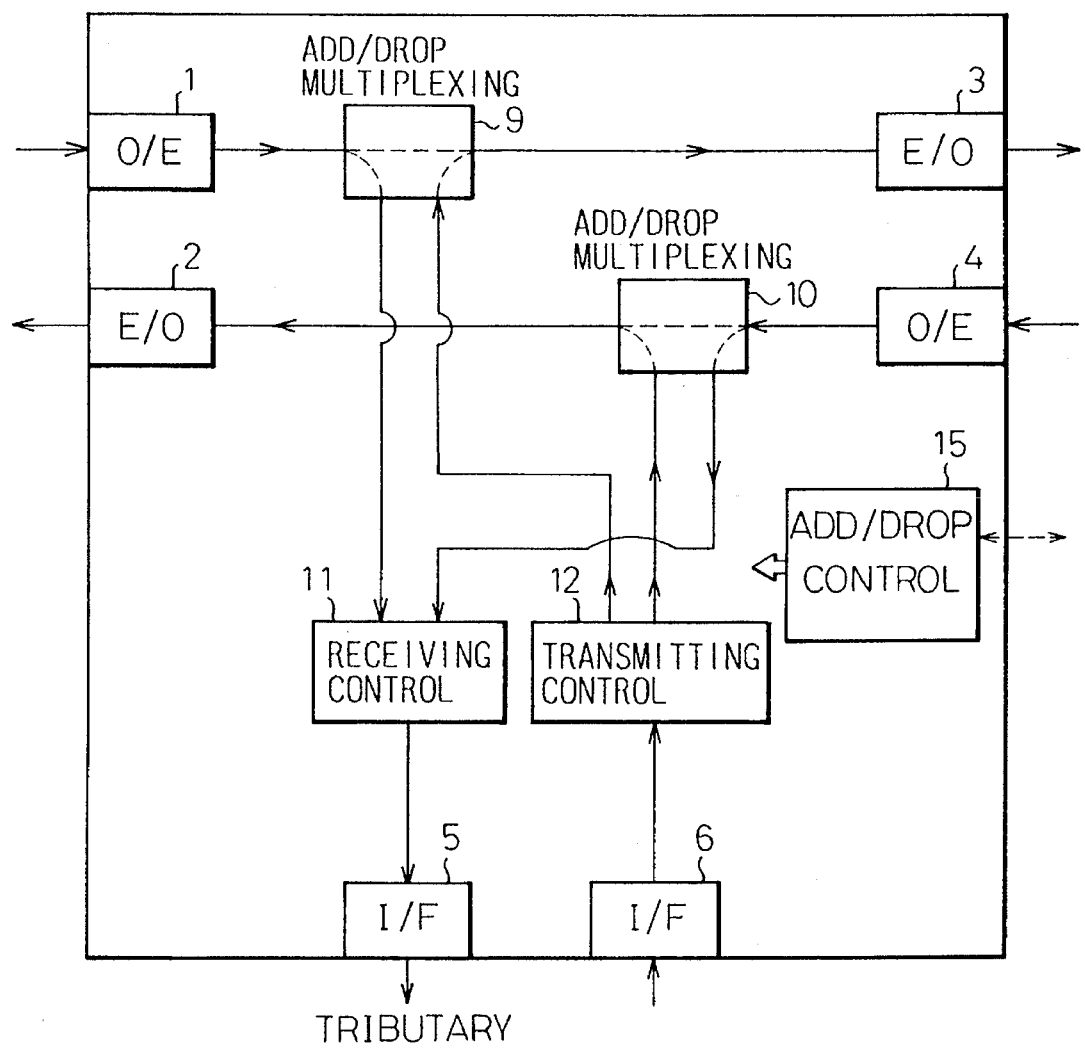
FIG. 7 is a device block diagram which shows an embodiment of an SDH 2-fiber ring optical multiplexing device according to the present invention, in which a bump-out function by means of priority assignments is added to the basic configuration of FIG. 4.

FIG. 7 is a device block diagram of an embodiment of an SDH 2-fiber ring optical multiplexing device according to the present invention with the addition, to the basic configuration of FIG. 4, of a bump-out function by means of priority assignment.

The difference in configurations between FIG. 7 and FIG. 4 is that the ADD/DROP control section 15 has been added in FIG. 7. Other parts have been assigned reference symbols the same as in corresponding parts of FIG. 4, and will not be described anew herein.

As shown in the next drawing, FIG. 8, in establishing the flow of data between nodes in the explanation that follows, the direction from the master M to the slave S (M → S) will be taken uniformly to be one direction, either the counter-clockwise (or clockwise direction) on the ring.

The node numbers used in the flowcharts to be indicated below are taken as increasing in the master-to-slave (M → S) direction. For example, in FIG. 8, in the case in which the number of node A is Nn, node D is Nn+1 and node B is Nn−1.

In FIG. 7, priorities are assigned to each of the time slots TSK#N in the overall ring, with all time slots specified as working time slots at the initial setting (i.e., normal condition). When a fault occurs, at the ADD/DROP multiplexing sections 9 and 10 or the transmitting control section 11 or receiving control section 12, high priority time slots bump lower priority time slots, protection channels being provided to connect the time slots with higher priority to these parts. The above-noted ADD/DROP control section 15 performs setting and change of the priorities of each of the above-noted parts.

FIG. 9 and FIG. 10 are drawings which explain the bump-out function which uses the priorities shown in FIG. 7.

On the left side of FIG. 9, as one example, is a table of the priority values 1 to 3 which correspond to each of the time slots TS#1 to TS#6, in which higher priority is indicated by lower values (1>2>3).

On the right side of FIG. 9 is shown a ring network consisting of the thrgee nodes A, B, and C, in which the above-noted six time slots TS#1 to TS#6 are used. When operation is normal, as described above, all time slots TS#1 to TS#6 are specified to be working time slots, with all six time slots being used between each of the nodes.

Should a fault such as an open line occur between node A and node B, the following operation will result.

First, the time slot TS#1, which has the highest priority (1) bumps out the time slot TS#5 (or time slot TS#6) which has the lowest priority (3). Next, the intermediate priority (2) time slot TS#2 (or time slot TS#3 or TS#4) bumps out the remaining time slot with a low priority (3), which is time slot TS#6. Since the remaining time slots TS#3 and TS#4 have the same priority (2) cannot bump each other, the above-noted bump-out operations result in time slot TS#5 being switched to become the protection time slot for time slot TS#1, and in time slot TS#6 switched to become the protection time slot for time slot TS#2.

Therefore, as shown in FIG. 10, even if a fault occurs between node A and node B, communications in the time slots TS#1 and TS#2 which have high priorities (1 and 2) are performed using the corresponding protection time slots formed by the bump-out operation which is performed when a fault occurs.

Figure 11:
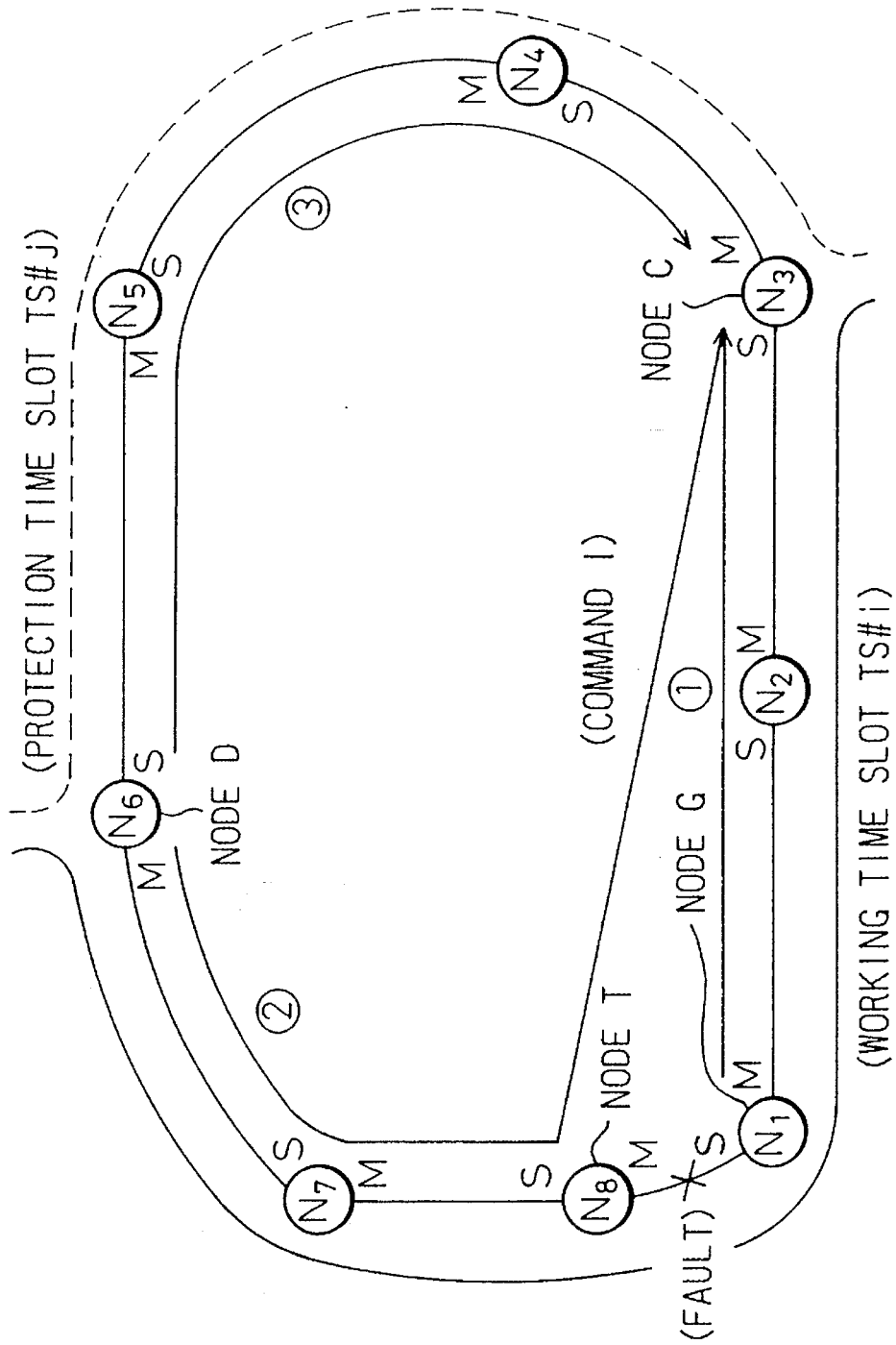
FIG. 11 is a drawing which shows an example of a ring network in which a fault has occurred in the embodiment of FIG. 7.

FIG. 11 shows an example of a ring network of the above-described embodiment, in which a fault has occurred.

FIGS. 12 through 15 shows an example of the fault recovery flow in the ring network of FIG. 11.

In FIG. 11, while during normal operation, the channel between node N3 and node N6 is set, with communications being performed using the working time slot TS#i (shown by the solid line in the drawing), if a fault occurs between node N8 and node N1 (indicated by x in the drawing), to achieve recovery on the above-noted channel, the protection time slot TS#j (indicated by the dotted line in the drawing) is provided between node N3 and node N6.

What follows is a detailed description of the operation that occurs when a fault occurs between node N1 and node NK (K=8 in FIG. 11) when the slave-side node N1 detects this condition, with reference being made to the flow diagrams of FIGS. 12 through 15.

In this description the ring is taken to be connected in the direction N1-N2-***-NK, and NK=N1−1. The command I that is used below has the destination address (node number) and the following values.

G: Node number (fault detection node N1)

T: Node number (the other end, NK, of the fault link)

C: Node number (one end of the channel passing through the TS#i which is switched to protection)

D: Node number (the other end of the channel passing through the TS#i which is switched to protection)

i: TS (time slot) number (time slot switched to protection)

j: TS (time slot) number (time slot bumped out by the switch to protection)

If these values have not yet been set, they are initially set to a value of 0. The setting of "G=N1" means that the value of G is set to N1.

Figure 12:
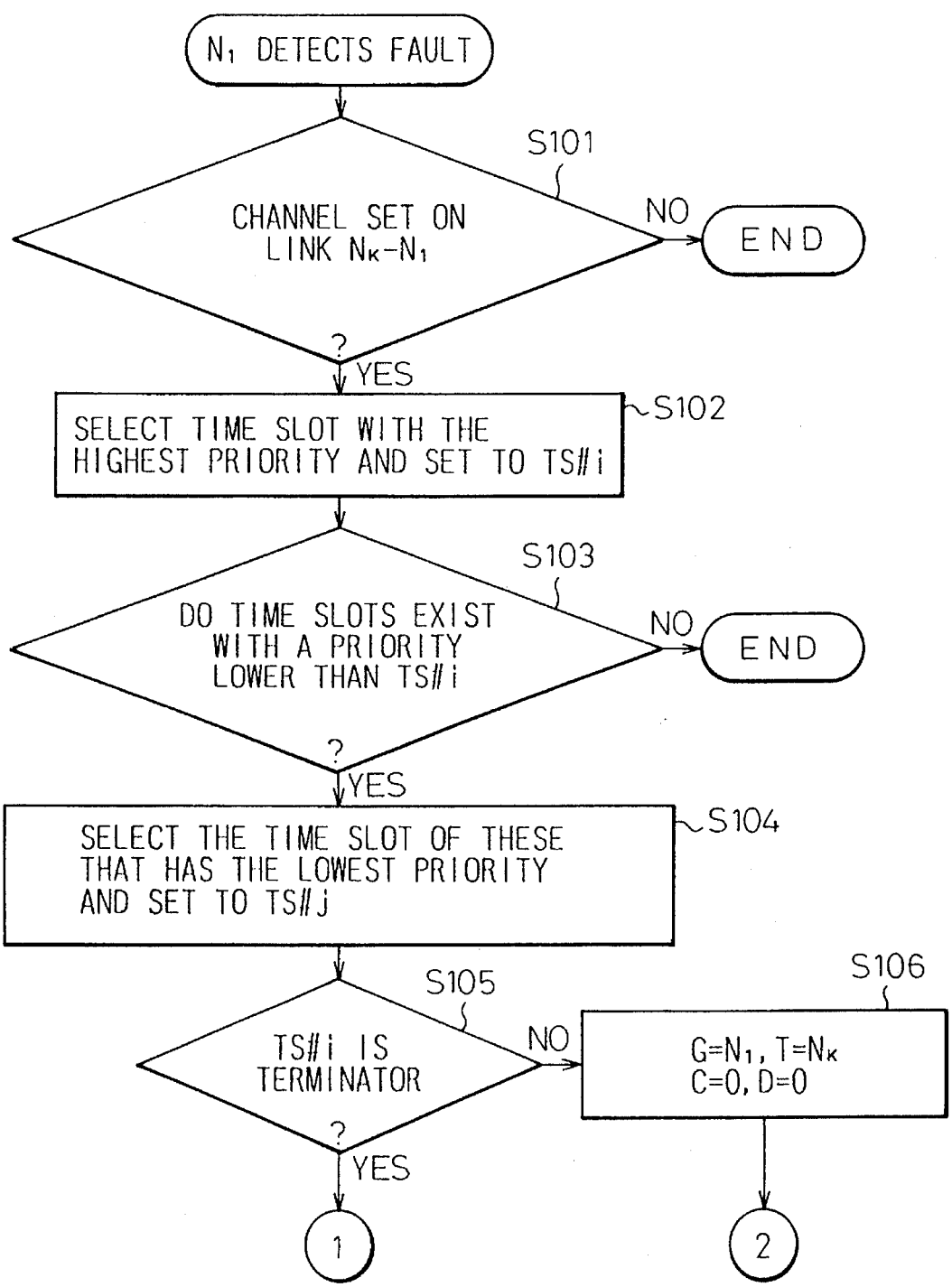
FIG. 12 is a flowchart which shows an example of the fault recovery control (1) at each node of the ring network of FIG. 11.

In FIG. 12, when node N1 detects a fault, at node N1 at step S101, a test of whether or not a channel (in FIG. 11, between N3 and N6) is set at link N1-NK (in FIG. 11, K=8). If the above-noted link N1-NK is not used in the channel between N3 and N6, because the occurrence of that fault does not influence the channel communications, this recovery operation is terminated. If the test determined that the above-noted channel was passing through the fault link N1-NK (i.e., if the result was YES), the time slot with the highest priority is selected at that link, this being made the protection link time slot TS#i (step S102).

Next, at step S103, a determination is made of whether there is a time slot having a lower priority than the above-noted selected protection time slot TS#i. If such a time slot does not exist, because bump-out by the above-noted time slot TS#i is not possible, the processing is terminated. If, however, there exist time slots having a priority lower than the time slot TS#i, the time slot of these time slots which has the lowest priority is selected this being bumped out by switching to protection as time slot TS#j (step S104).

Then, at step S105, a test is made as to whether this node N1 is the terminating node of the above-noted channel. In the case of FIG. 11, since N1≠N3 or N6, the process of finding the nodes at both ends of the channel is executed in subsequent steps. At step S106, the settings of various parameters are made for that condition. That is, settings such as fault detection node G=N1, the node T at the other end of the fault link=NK (in FIG. 11 K=8), the node C at one end of the channel passing through TS#i which is switched to protection=0 (not yet set), and the node D at the other end of the channel passing through TS#i which is switched to protection=0 (not yet set) are made.

Figure 13:
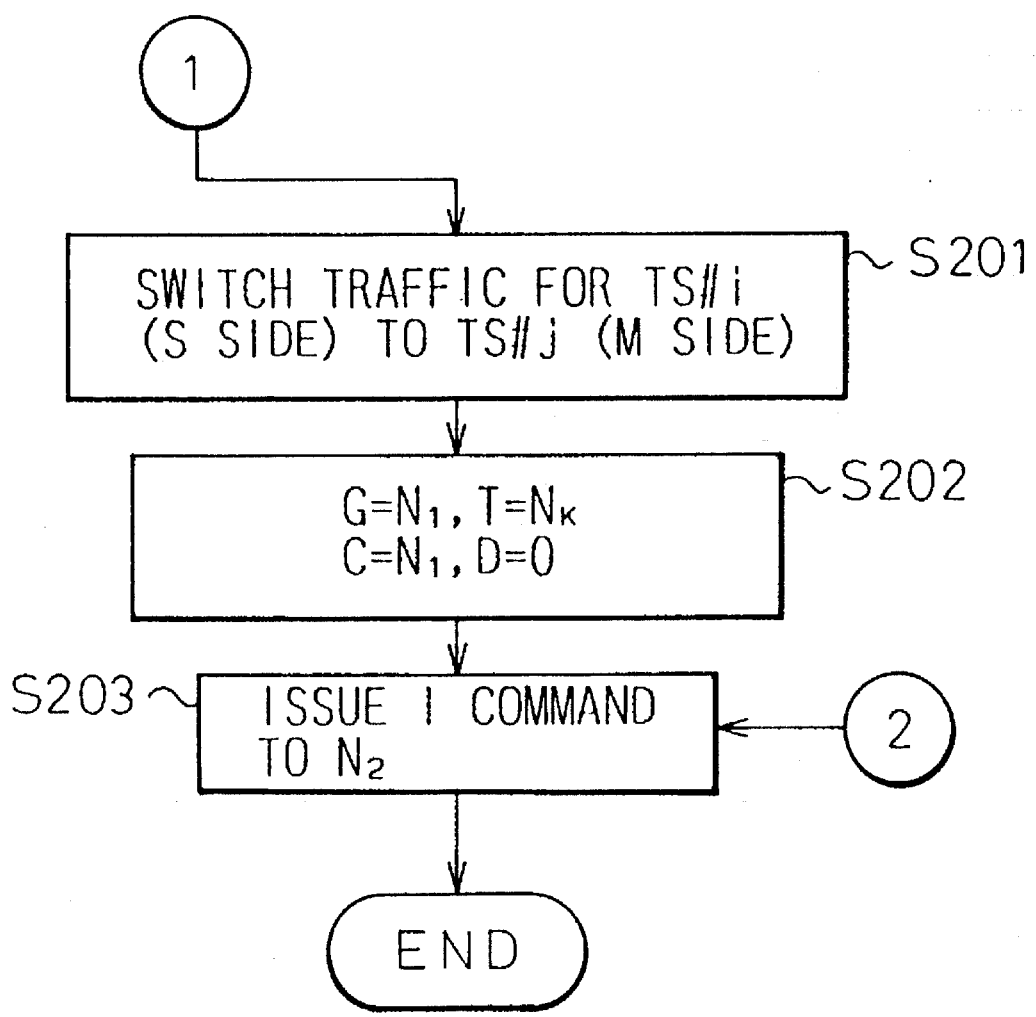
FIG. 13 is a flowchart which shows an example of the fault recovery control (2) at each node of the ring network of FIG. 11.

At step S203, which is shown in FIG. 13, by issuing the command I to the next node N2, the above-noted processing is continued. In the case in which node N1 had been the terminating node of a channel passing through TS#i which is switched to protection, at step S201 in FIG. 13 traffic would have been switched from the above-noted time slot TS#i (S side) to the time slot TS#j (M side), and node N1 will be set as node C (at step S202). Then, by issuing the same type of command I, processing will be continued at node N2 (step S203).

Figure 14:
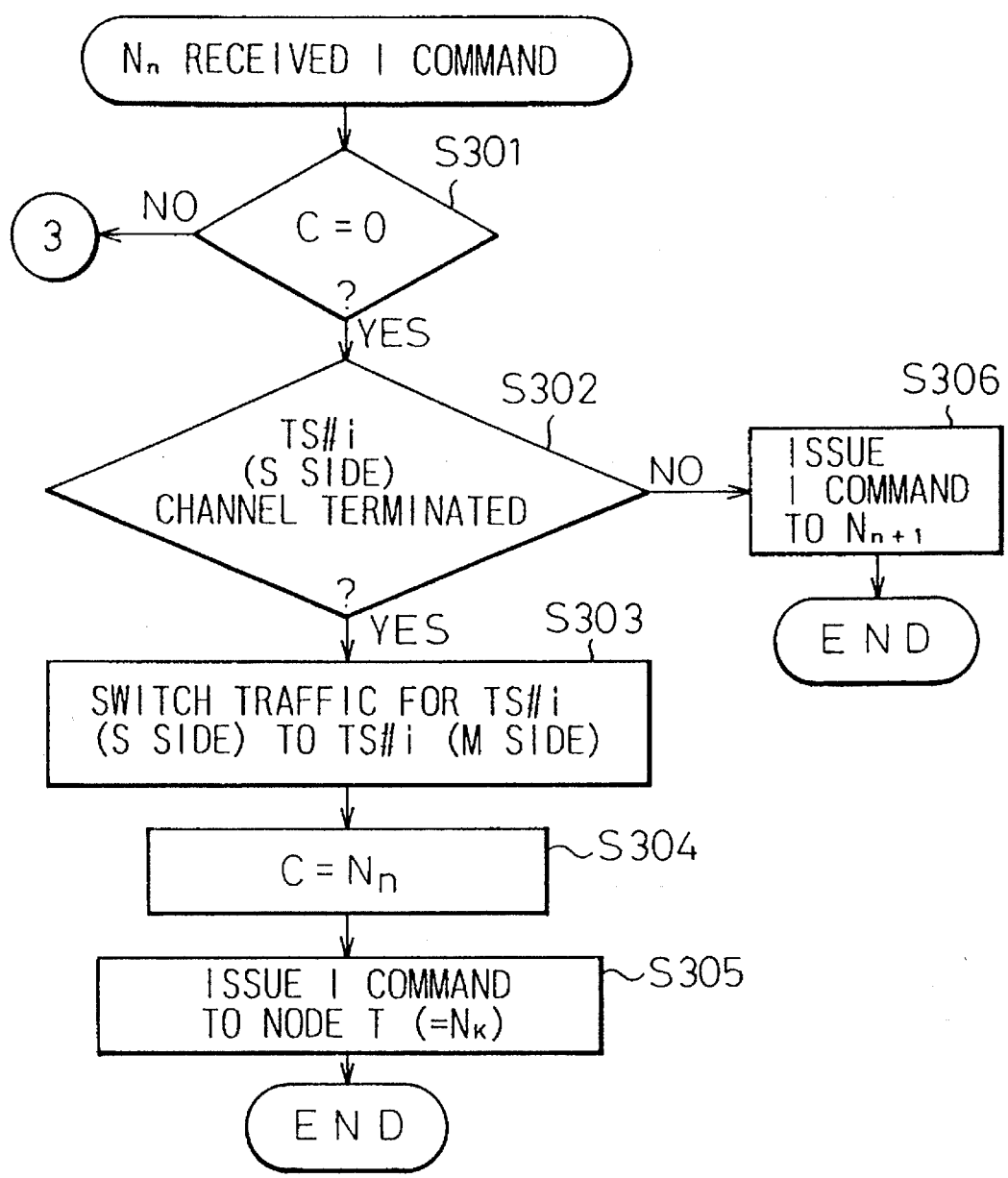
FIG. 14 is a flowchart which shows an example of the fault recovery control (3) at each node of the ring network of FIG. 11.
Figure 15:
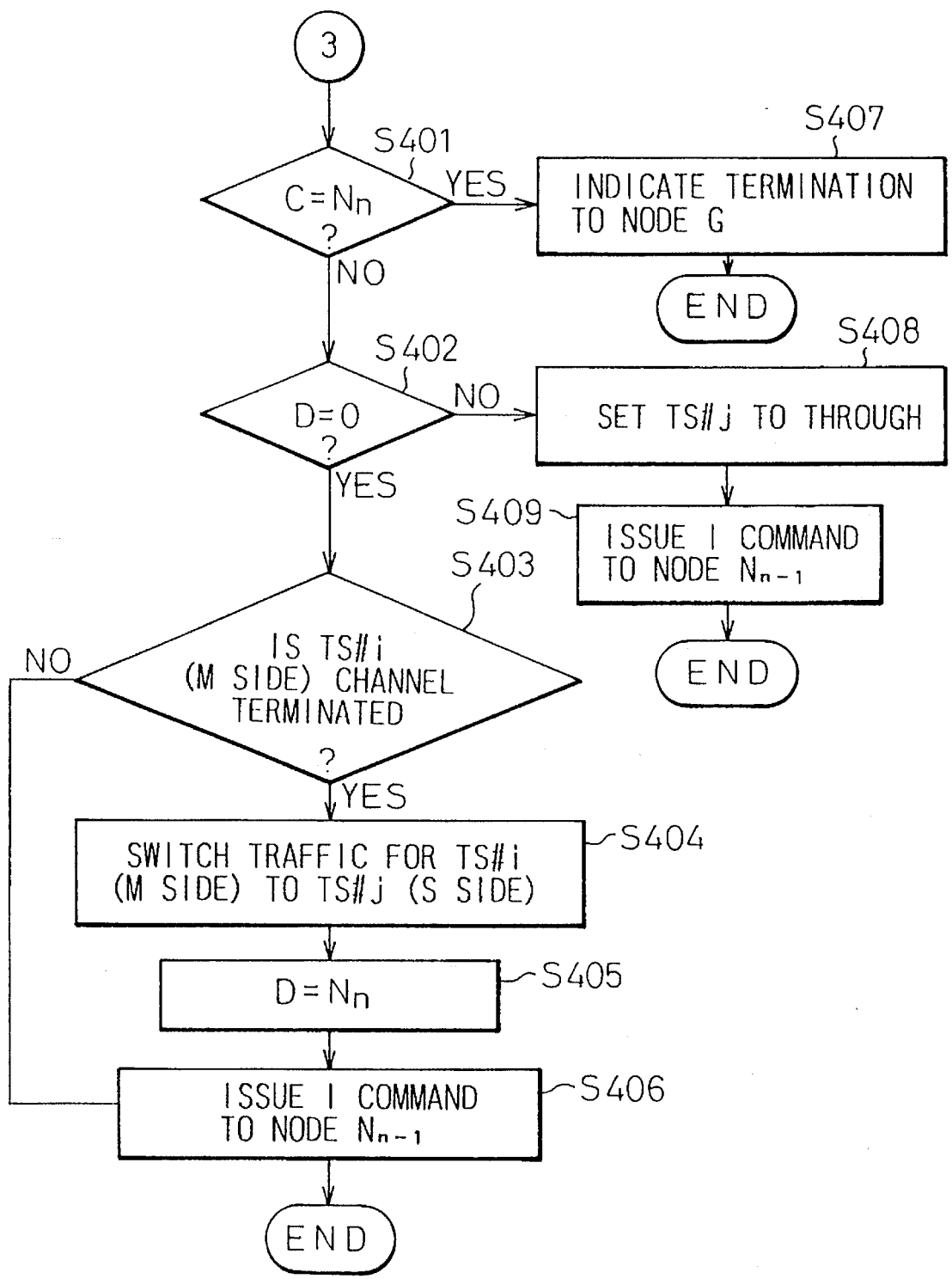
FIG. 15 is a flowchart which shows an example of the fault recovery control (4) at each node of the ring network of FIG. 11.

In FIG. 14, first, in step S301 a test is made as to whether the node Nn (n=2 in this case) which received the above-noted command I is already set as one end of the channel (that is, is C=0?). In the example of FIG. 11, since C=0, at step S302 a second test is made as to whether node N2 is the termination of the time slot TS#i channel. The command I is issued repeatedly (step S306) to node NN+1 until the termination of the above-noted channel is found, with steps S301 and thereafter executed once again for node NN+1. In the example of FIG. 11, at node N3 the terminating node will be detected at step S302.

Then the traffic will be switched from the above-noted time slot TS#i (S side) to the time slot TS#j (M side), with node Nn (in FIG. 11 n=3) being set as node C (steps S303 and S304). Next, command I is issued to node T (=Nk, in FIG. 11, k=8) which is the other end of the above-noted fault link (step S305).

By receiving the above-noted command I, for the node Nk (in FIG. 11, k=8), which is the other end of the fault link, the processing after the above-noted step S301 at which Cπ0 (=Nn, in FIG. 11 n=3) is executed, and in the same manner the processing after step S301 is executed for the nodes in the sequence nk-1, nk-2, and so on. Then, the processing of step S402 and thereafter is repeated executed for nodes until the currently processed node Nn reaches the node C (in FIG. 11 node C=N3) which is one end of the above-noted channel (step S402), the processing after step S402 being repeatedly executed for each node Nk-1, Nk-2, and so on.

At step S401, a test is made as to whether the node D, which is the other end of the channel which passes through time slot TS#i (M side) which is switched to protection has been discovered (that is, is D=0?), and since at the present time D=0 (not yet set), steps S403 and S406 are executed for each node in the sequence Nk-1, Nk-2, and so on, until the channel terminating node on the other end of the above-noted time slot TS#i (M side) is discovered (that is, in the case of FIG. 11, until the node N6 is reached). In the case in which the local node is determined to be the channel terminating node at step S403, traffic is switched at that node Nn from the above-noted time slot TS#i (M side) to the TS#j (S side), and node D is set to Nn (in FIG. 11, n=6) (step S404 and step S405). Then the command I is issued to the node Nn-1 (step S406).

Thereafter, for each node in the sequence of node Nn-1, Nn-2 and so on, the time slot TS#j which is bumped out by the time slot TS#i is set to "through," this proceeding between each of the nodes, until the node C (in FIG. 11, C=N3), which is an end of the above-noted channel, is reached (steps S402, S408, and S409).

Finally, when C=Nn occurs at step S401, that is, at the point at which the channel between node C and node D is joined by the above-noted time slot TS#j, the end of this fault recovery processing is reported to the original node G (in FIG. 11, N1) at which the fault was detected.

Figure 16:
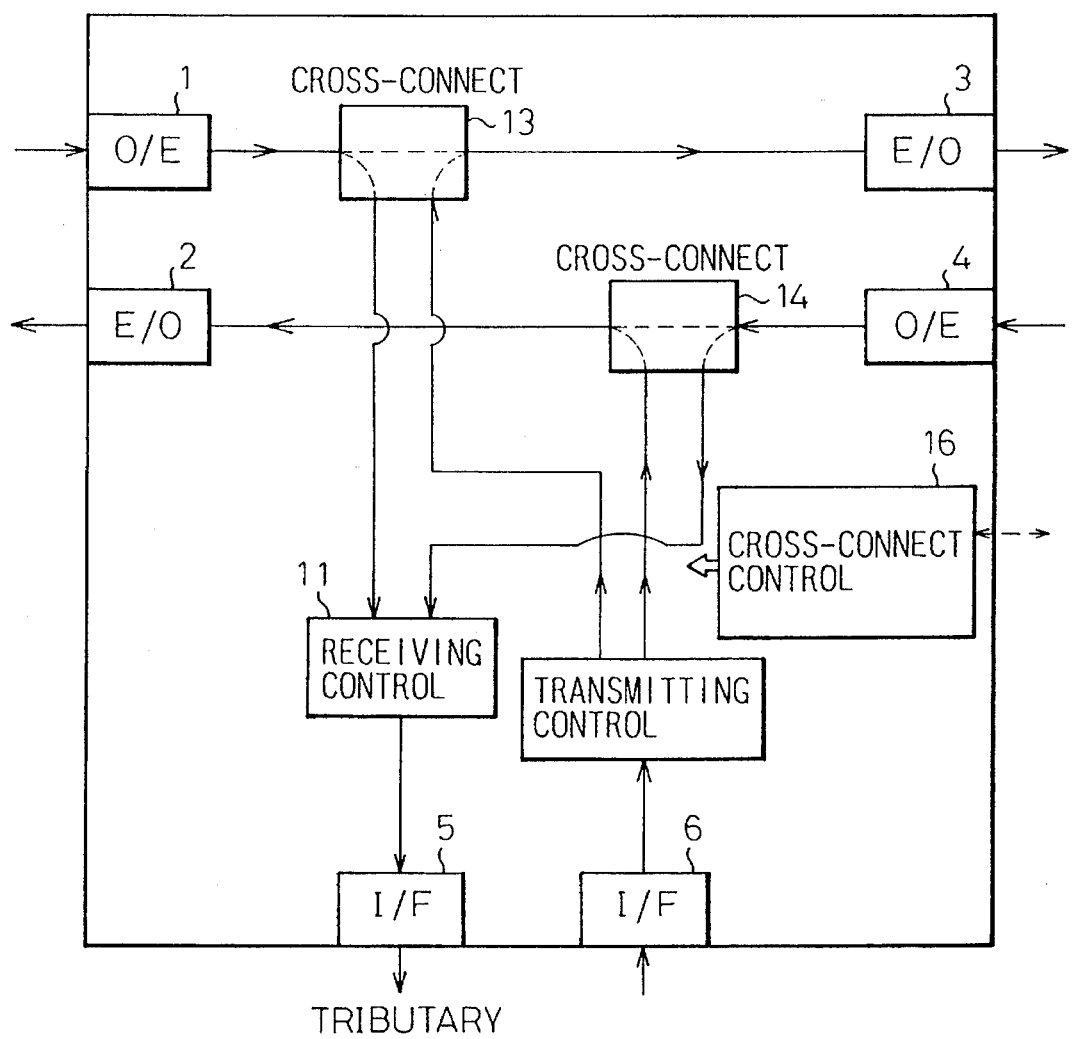
FIG. 16 is a device block diagram which shows an embodiment of an SDH 2-fiber ring optical multiplexing device according to the present invention, in which a bump-out function by means of priority assignments is added to the basic configuration of FIG. 5.

FIG. 16 is another embodiment of an SDH 2-fiber ring optical multiplexing device according to the present invention, in which a bump-out function by means of priority assignments is added to the configuration of FIG. 5.

The difference in terms of configuration between FIG. 16 and FIG. 5 is that in FIG. 16 there is the addition of the cross-connect control section 16. Other parts that are the same as in FIG. 4 have been assigned the same reference symbols, and will not be described anew herein.

Whereas in the above-described embodiment of FIG. 7, priority was defined for time slots in terms of the overall ring, in this embodiment the priorities are assigned between each of the nodes individually. Therefore, to execute bump-out of time slots between each of the nodes while maintaining priorities, it is necessary to have, in addition to the above-described ADD/DROP multiplexing function, a cross-connect function which switches time slots. To execute such a cross-connect function, it is also necessary to verify beforehand whether or not it is possible to execute the above-noted bump-out end-to-end between channels. The above-noted cross-connect control section 16 executes and controls such a cross-connect function.

Figure 17:
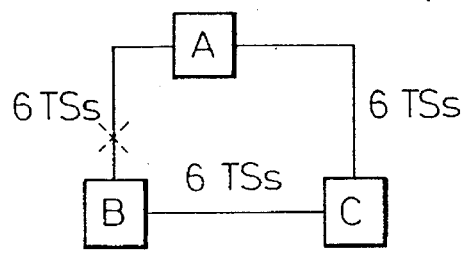
FIG. 17 is an explanatory drawing (1) which explains the bump-out function of the embodiment of FIG. 16.
Figure 18:
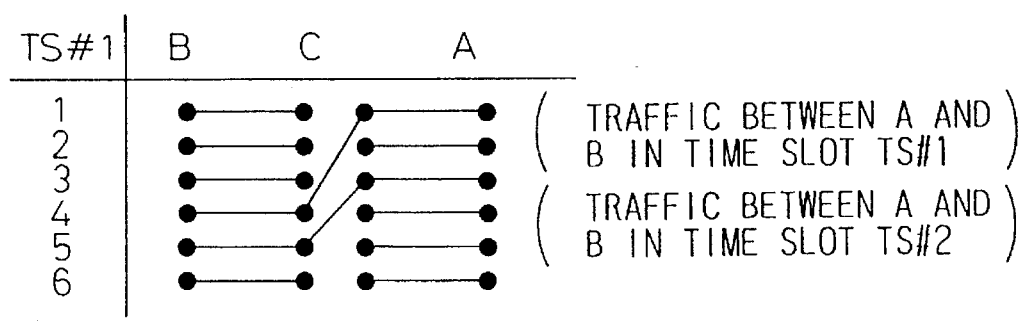
FIG. 18 is an explanatory drawing (2) which explains the bump-out function of the embodiment of FIG. 16.

FIG. 17 and FIG. 18 explain the bump-out function of the embodiment of FIG. 16.

On the left side of FIG. 17, as one example, is a table of the priority values 1 to 3 which correspond to each of the time slots TS#1 to TS#6, in which higher priority is indicated by lower values (1>2>3).

The right side of FIG. 17 illustrates the network corresponding to the above-noted table. When operation is normal, all time slots TS#1 to TS#6 are specified to be working time slots, with all six time slots used between each of the nodes.

If a fault such as an open line occurs between node A and node B, the cross-connect control section 16 of each node attempts to recover the traffic flowing in time slots between these nodes which have the highest priorities (P), these being TS#1 (P=1) and TS#2 (P=1). That is, the first selections of usable, lower priority time slots to bump out are the selection of time slot TS#4 (P=3) and time slot TS#5 (P=3) between nodes B and C and the selection of time slot TS#1 (P=3) and time slot TS#3 (P=2) between nodes C and A. The above-noted cross-connect control function switches traffic to these selected time slots, thereby restoring the channel which was disrupted by the occurrence of the fault.

FIG. 18 illustrates the connections after the above protection switching is performed.

Figure 19:
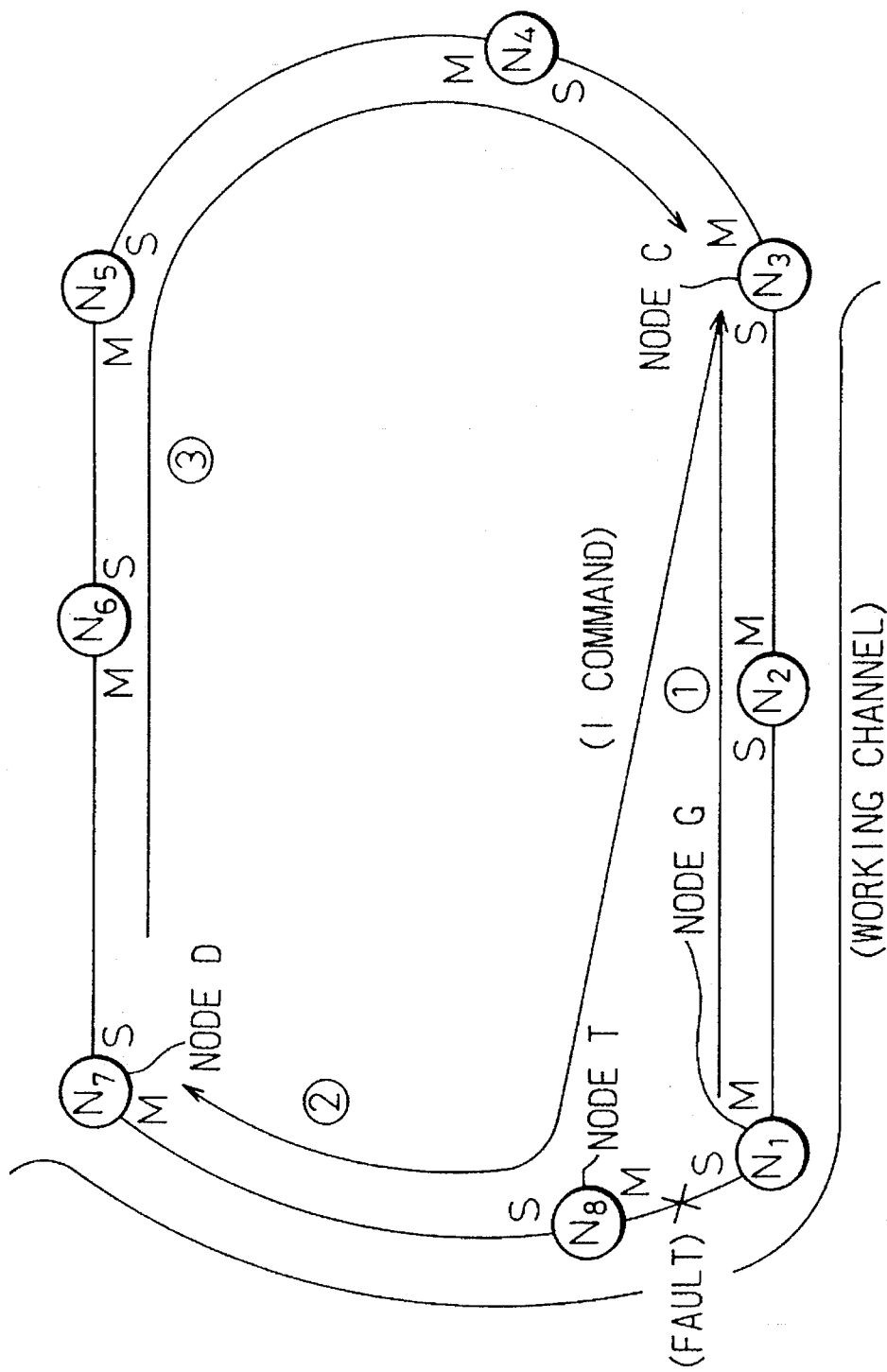
FIG. 19 is a drawing which shows an example of a ring network in which a fault has occurred in the embodiment of FIG. 16.
Figure 20:
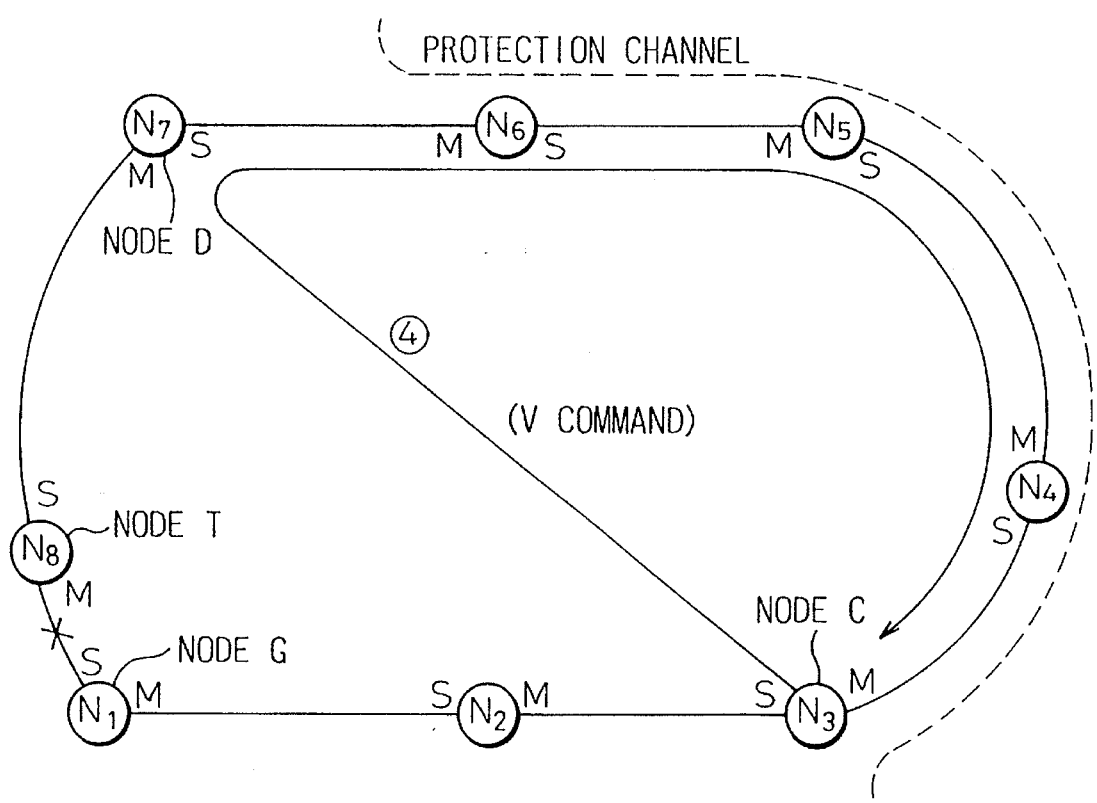
FIG. 20 is a drawing which shows an example of a ring network of the embodiment of FIG. 16 after fault recovery.

FIG. 19 and FIG. 20 show an example of a ring network in the case of the above-noted embodiment, in which a fault has occurred.

FIGS. 21 through 26 show an example of the flow of fault recovery control in the ring network of FIG. 19 and FIG. 20.

In FIG. 19, during normal operation, the channel between node N3 and node N7 is set, with communications being performed using the working time slot between each of the nodes (shown by the solid line in the drawing), and a fault occurring during this communication between node N8 and node N1 (indicated by X in the drawing). In FIG. 20, to achieve recovery on the above-noted channel, the protection switching time slot (indicated by the dotted line in the drawing) is set to the connection between these nodes in the reverse direction.

What follows is a detailed description of the above-noted operation that occurs when a fault occurs between node N1 and node NK (K=8 in FIG. 11) when the slave-side node N1 detects this condition, with reference being made to the flow diagrams of FIGS. 21 through 26.

In this description the ring is taken to be connected in the direction N1-N2-***-NK, and NK=N1−1. The commands I and V that are used below have the destination address (node number) and the following values.

G: Node number (fault detection node N1)

T: Node number (the other end, NK, of the fault link)

C: Node number (one end of the channel passing through the TS#i which is switched to protection)

D: Node number (the other end of the channel passing through the TS#i which is switched to protection)

P: Priority x: M-side time slot number y: S-side time slot number

If these values have not yet been set, they are initially set to a value of 0. The setting of "x=i" means that the value of x is set to i, in which case the value of i does not change.

The above-noted command I is used when a test of whether or not protection switching is possible is made, and the above-noted command V is used when executing the actual protection switching. The priorities of the time slots of the M and S sides are managed separately.

Figure 21:
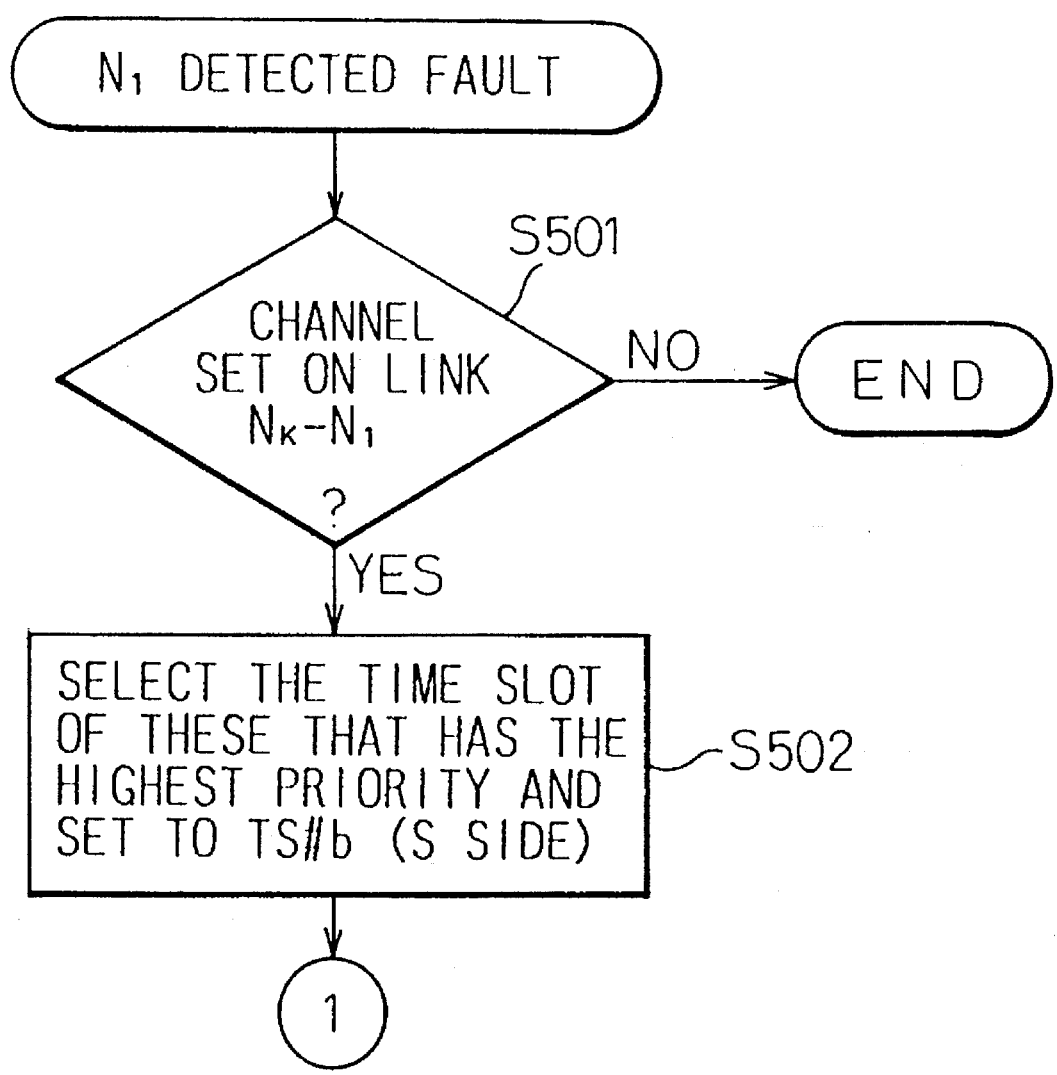
FIG. 21 is a flowchart which shows an example of the fault recovery control (1) at each node of the ring network of FIG. 19.

In FIG. 21, when node N1 detects a fault, at node N1 at step S501, a test of whether or not a channel (in FIG. 19, between N3 and N7) is set at link N1-NK (in FIG. 19, K=8). If the above-noted link N1-NK is not used in the channel between N3 and N6, because the occurrence of that fault does not influence the channel communications, this recovery operation is terminated. If the test determined that the above-noted channel was passing through the fault link N1-NK (i.e., if the result was YES), the time slot with the highest priority is selected at that link, this being made the protection link time slot TS#b (S side) (step S202).

Figure 22:
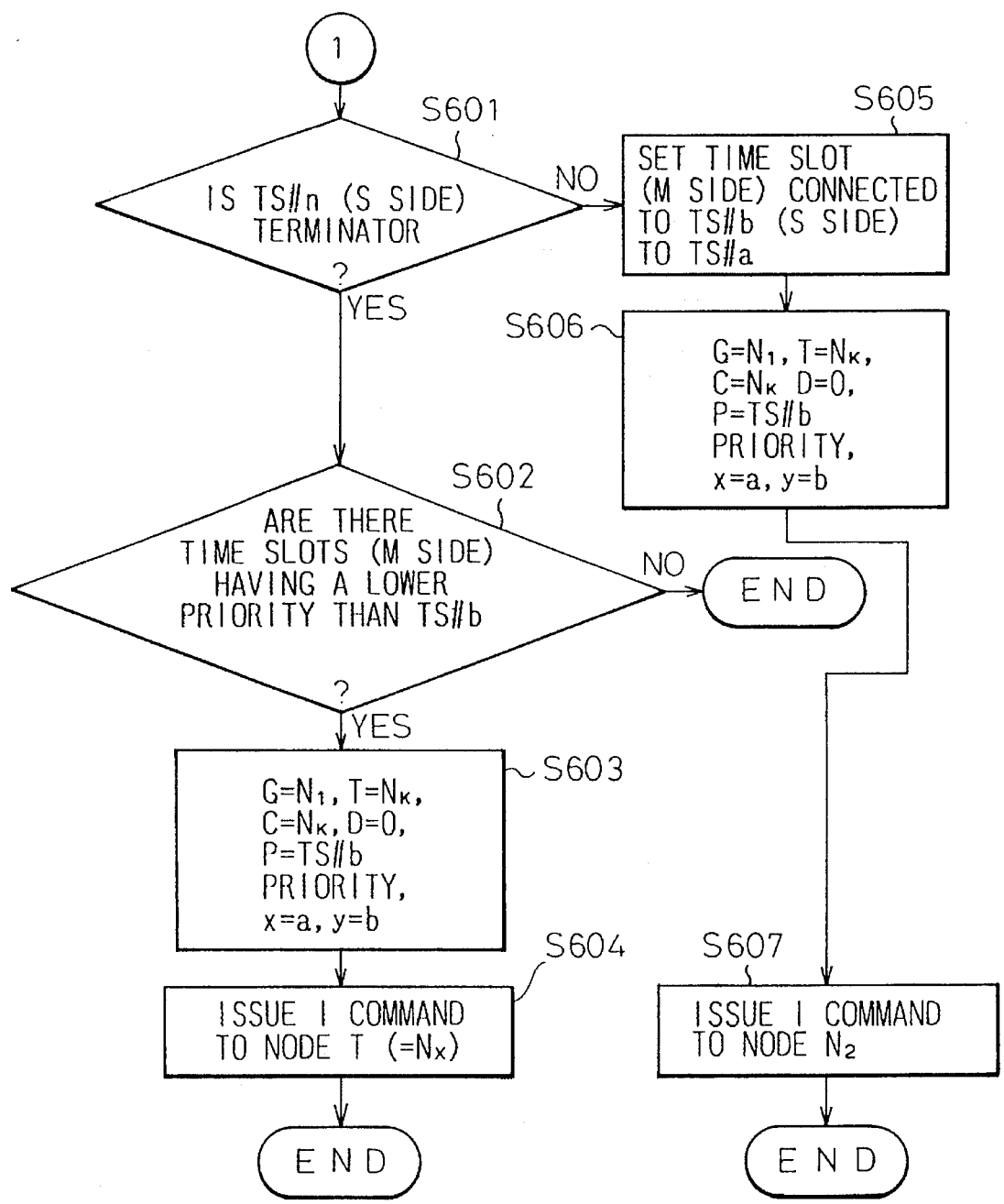
FIG. 22 is a flowchart which shows an example of the fault recovery control (2) at each node of the ring network of FIG. 19.

Next, at step S603 of FIG. 22, a test is made as to whether the above-noted time slot TS#b (S side) has terminated the above-noted channel. If it has, at step S602, a determination is made that there is an M-side time slot having a priority that is lower than the time slot TS#b. In the case in which there is no such time slot, because the above-described bump-out cannot be performed, this processing is terminated. If, on the other hand, there exists a time slot having a priority that is lower than the time slot TS#b, at step S106, the fault detection node G1=N1 is set as a parameter of node N1, the node T, which is at the other end of the fault link, is set to NK (in FIG. 19, K=8), node C at one end of the channel is set to N1, node D at the other end of the channel is set to 0 (not yet set), and the P=TS#b priorities are set as TSx=a for the M side and Tsy=b for the S side, this data being reported by means of the command I to the node T (in FIG. 19, K=8) at the other end of the fault link.

In the case in which the test result at step S605 is that there is no termination (this corresponding to the case shown in FIG. 19), at step S605, the M-side time slot connected to the S-side time slot TS#b is made time slot TS#a, and the same type of parameter values are set as at step S603. However, because the terminating node has not yet been determined, C=0, and this data is reported to the next node N2 (at step S602) by means of the command I.

Figure 23:
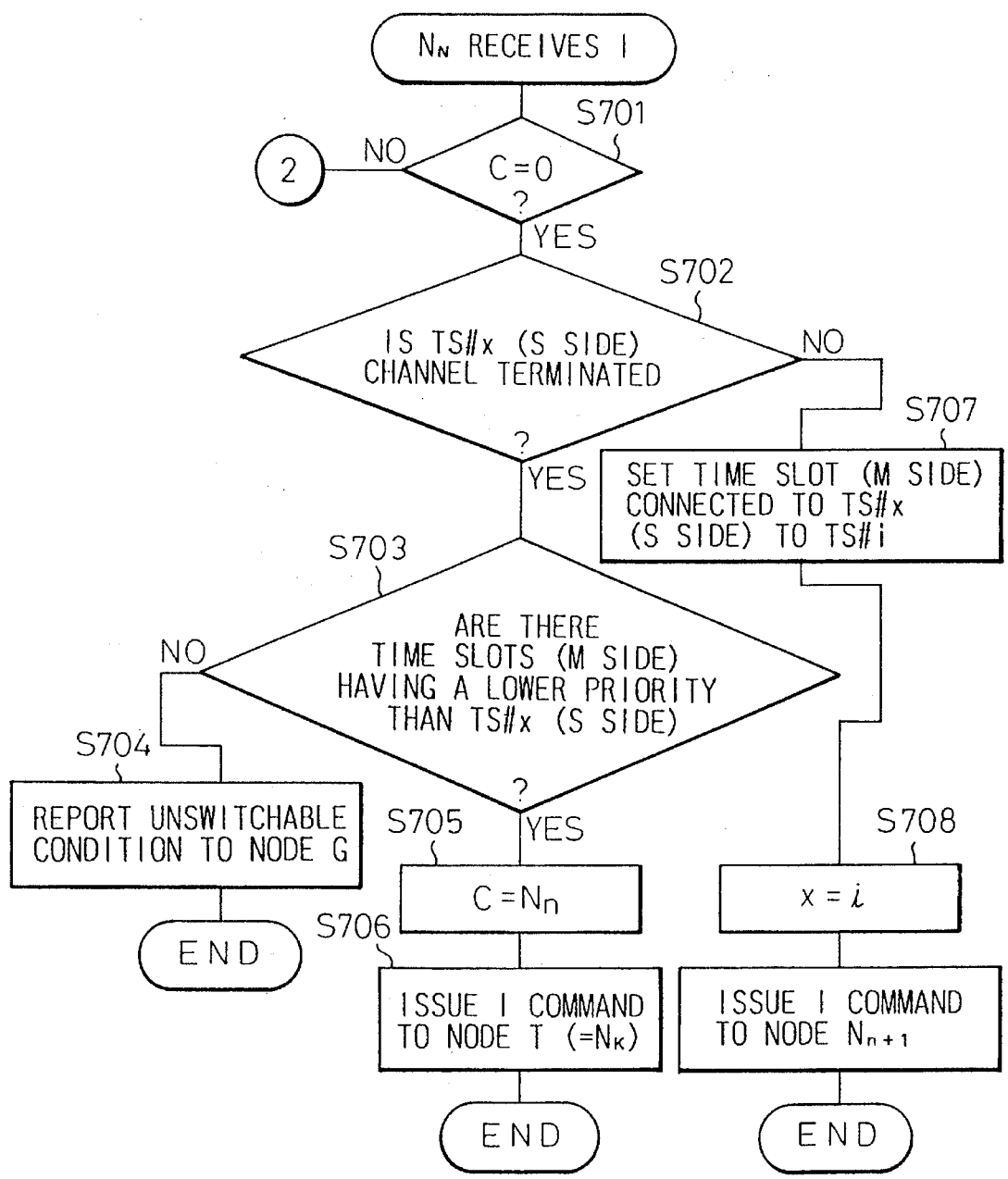
FIG. 23 is a flowchart which shows an example of the fault recovery control (3) at each node of the ring network of FIG. 19.

In FIG. 23, when the node Nn receives the command I, first, at step S701, a test is made to determine whether one end of the channel has been discovered. In the case of the node N2 of FIG. 19, it has not been discovered yet, so that at step S702 a test is again made as to whether the time slot TS#x (S side) ends the channel. In the case of the above-noted node N2, since this is not the termination, the M-side time slot which is connected to it is set to TS#i, x is set to i, and the command I is issued to the next node, N3 (steps S707 to S709). In the case in which the node N3 receives the command I, at the above-noted step S702, it will be judged that this is the termination (in the example of FIG. 19), and at step S702 a test is performed to see if there exists an M-side time slot having a priority that is lower than the S-side time slot TS#x.

Figure 24:
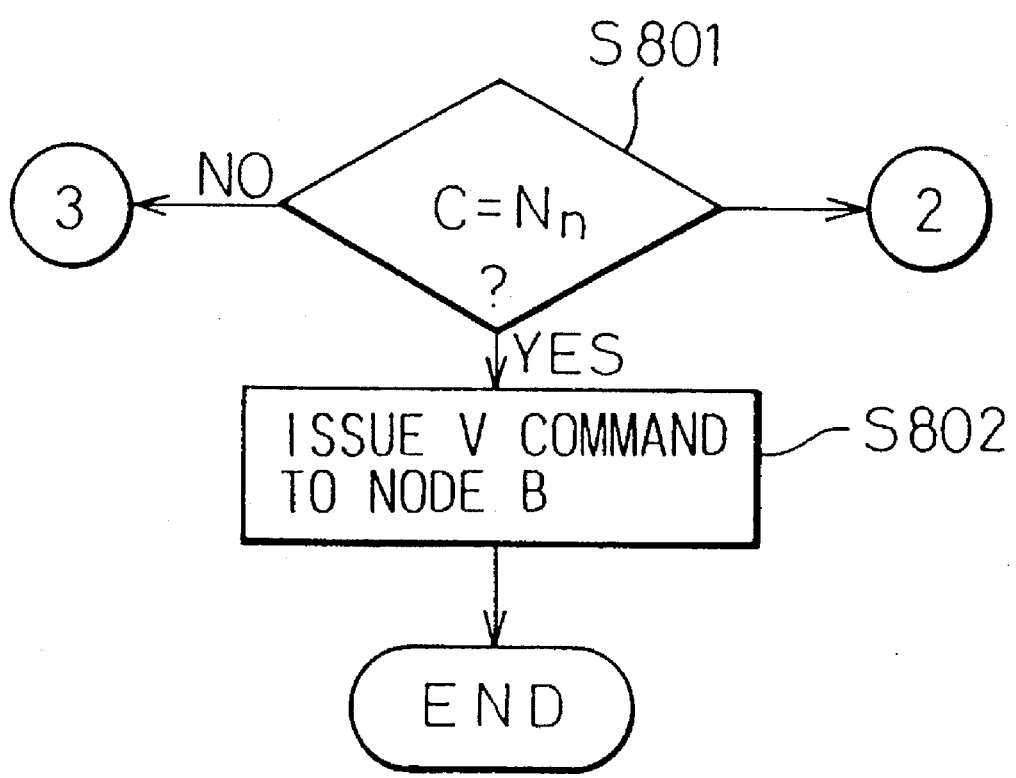
FIG. 24 is a flowchart which shows an example of the fault recovery control (4) at each node of the ring network of FIG. 19.

If such a time slot cannot be found, the channel be will judged to be unrecoverable, and this unrecoverable (unswitchable) condition will be reported to the fault node G (=N1). If, on the other hand, the time slot described above does exist, the node C, which is one end of the channel, is set to Nn (n=3) and the I command is issued to the node T, which is the other end of the channel (steps S705 and S706). With respect to node T (in FIG. 19, N=8), which receives this I command, at step S701 the test result is that C≠0, and a test is performed as shown in FIG. 24 as to whether that node coincides with node C. If it does coincide with node C, at step S802 the command V, which switches the pass connection, is issued to node D, which is the other end of the channel. In the example of FIG. 19, node T (=N8) πnode C (=N3), so that at this point control of flow proceeds to the processing of FIG. 25.

Figure 25:
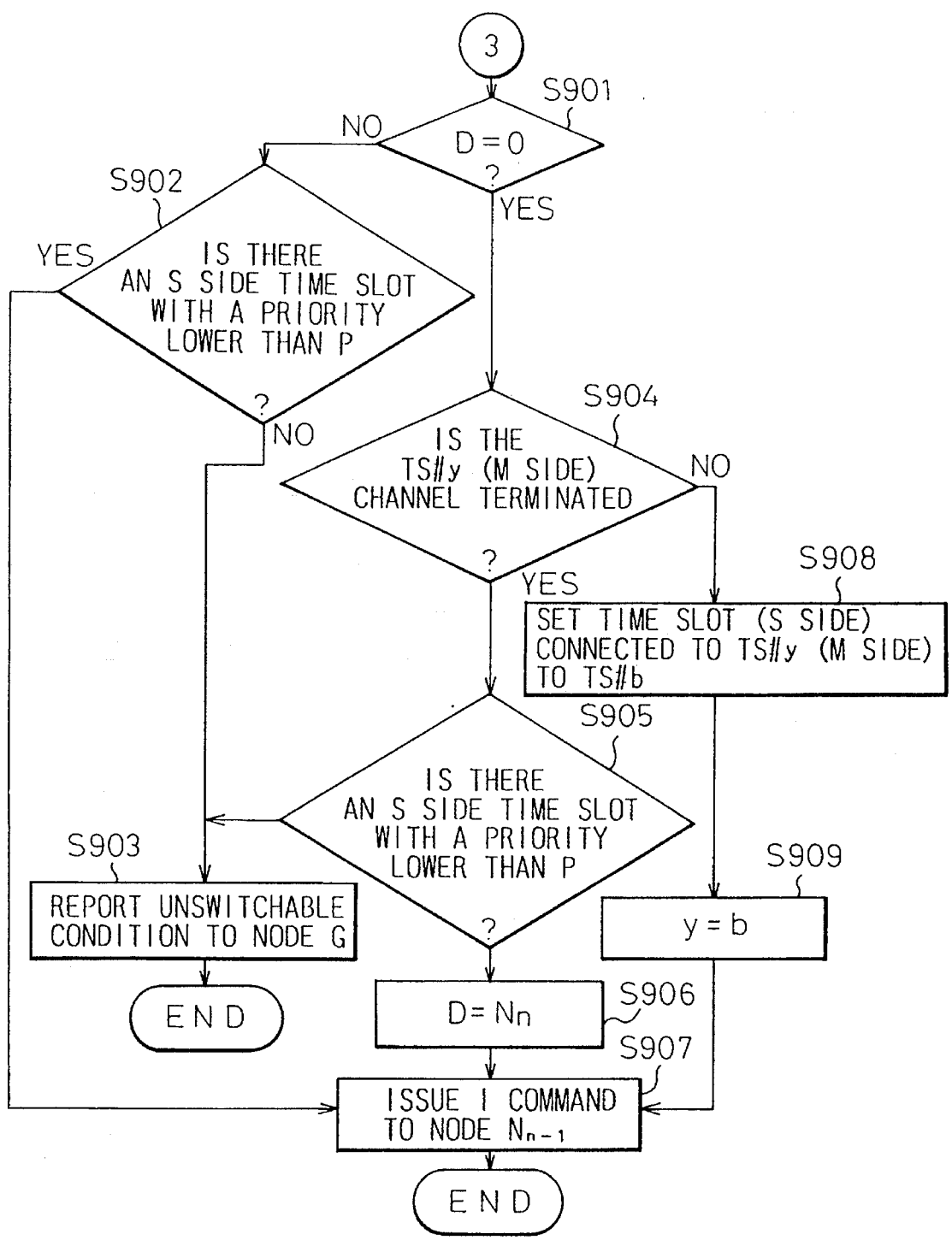
FIG. 25 is a flowchart which shows an example of the fault recovery control (5) at each node of the ring network of FIG. 19.

At step S901 of FIG. 25, a test is made to determine whether the other end of the channel has been discovered. In the example of FIG. 19, because this has not been discovered, a test is made at step S904 as to whether the node is the termination. In the case of node N8 of FIG. 19, which is not the termination, the S-side time slot which is connected to its M-side time slot TS#y is set to the TS#b time slot, y is set to b, and the I command is sequentially issued to the nodes Nn-1 until the ending node is discovered (steps S908, S909, S907).

When the end of the channel is finally reached at node N7 of FIG. 19, at step S905 a determination is made as to whether there exists on the S side a time slot which has a priority lower than P. In the case in which such a time slot exists, Nn (in FIG. 19, n=7) is set as node D, the other end of the channel, and the I command is issued to the previous stage, node Nn-1 (steps S906 and S907). If it was not possible to find such as time slot, at that point it will be judged that the channel is unrecoverable, and this unrecoverable (unswitchable) condition will be reported to the fault node G (=N1) (step S903).

For the node Nn-1, which receives the above-noted I command, a test of whether there exists a time slot with a priority lower than the S side will be made at step S902 until a judgment is made at step S904 of FIG. 24 that node C (in FIG. 19, N=3), which is one end of the channel, has been reached, and if such a time slot exists, the I command is sequentially issued to the previous nodes Nn-1 (step S907). If it was not possible to find such a time slot, at that point it will be judged that the channel is unrecoverable, and this unrecoverable (unswitchable) condition will be reported to the fault detection node G (=N1) (step S903).

Figure 26:
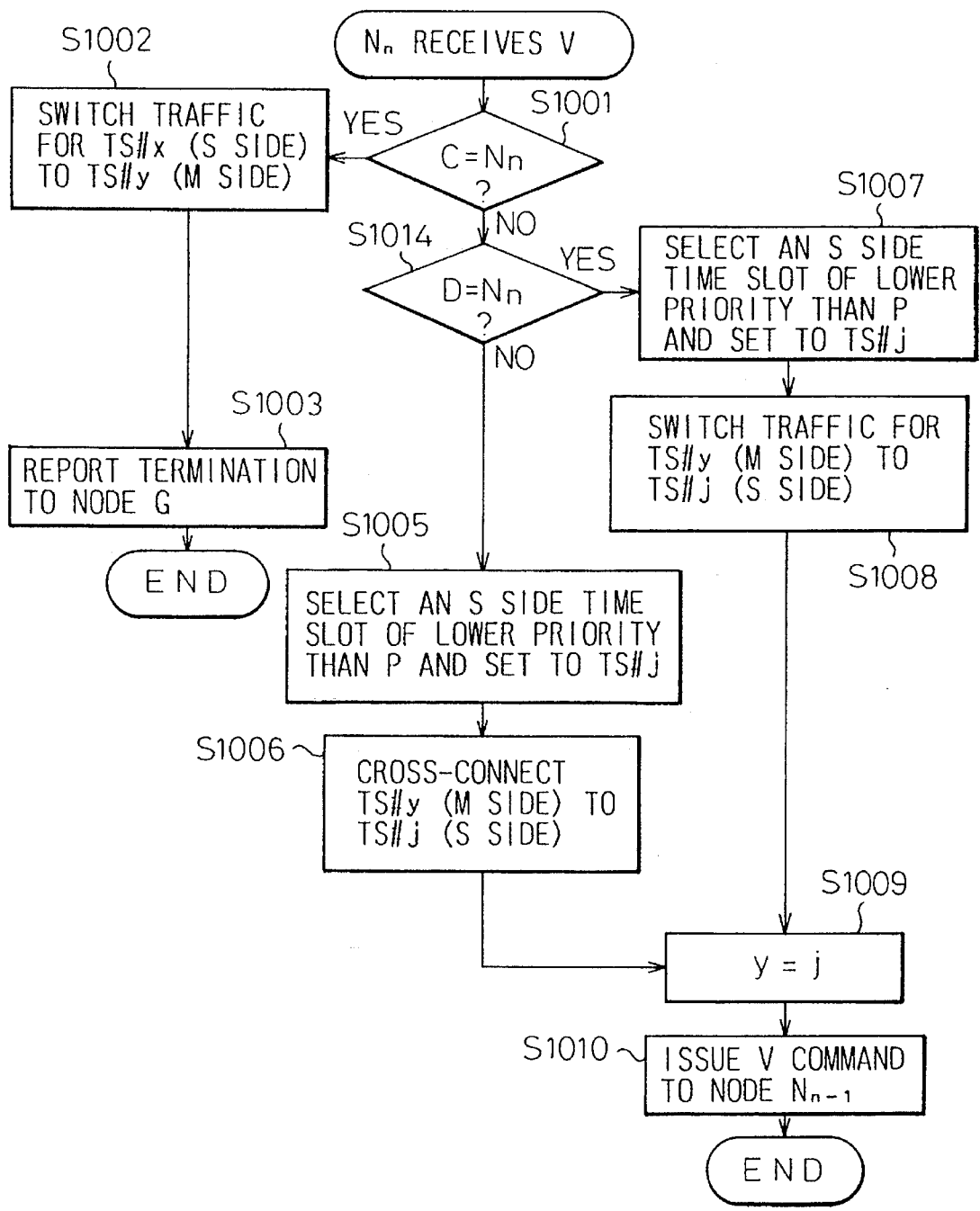
FIG. 26 is a flowchart which shows an example of the fault recovery control (6) in the ring network of FIG. 20.

FIG. 26 corresponds to FIG. 20, and shows the operational flow for each of the nodes which receive the V command which is issued when the node Nn-1 which received the I command at step S801 of FIG. 24 reaches node C (in FIG. 19, N=3), which is one end of the channel.

First, for the node D (N7 in FIG. 20), at the other end of the channel, which receives the V command detected at step S1004, the S-side time slot having a priority lower than P is selected, this being set to TS#j (step S1007). Then the traffic to the associated M-side time slot TS#y is switched to the above-noted S-side time slot TS#j, y is set to j, and the V command is issued to the previous stage node Nn-1 (steps S1007 to S1010).

For each node after the node Nn-1, until the node C (N3 in FIG. 20) which is the other end of the channel is reached, the S-side time slot is selected which has a priority lower than P, this being set to TS#j (step S1005), the M-side time slot TS#y being cross-connected to the above-noted S-side time slot TS#j (step S1006), y being set to j, and the V command being issued sequentially to the above-noted nodes Nn-1 (steps S1009 and 1010). Finally, at the point at which the above-noted node Nn-1 is the node C (step S1001), the traffic to its S-side time slot TS#x is switched to the above-noted M-side time slot TS#y, and a report of the completion of channel recovery is issued to the fault detection node G (=N3) (steps S1002 and S1003).

Figure 27:
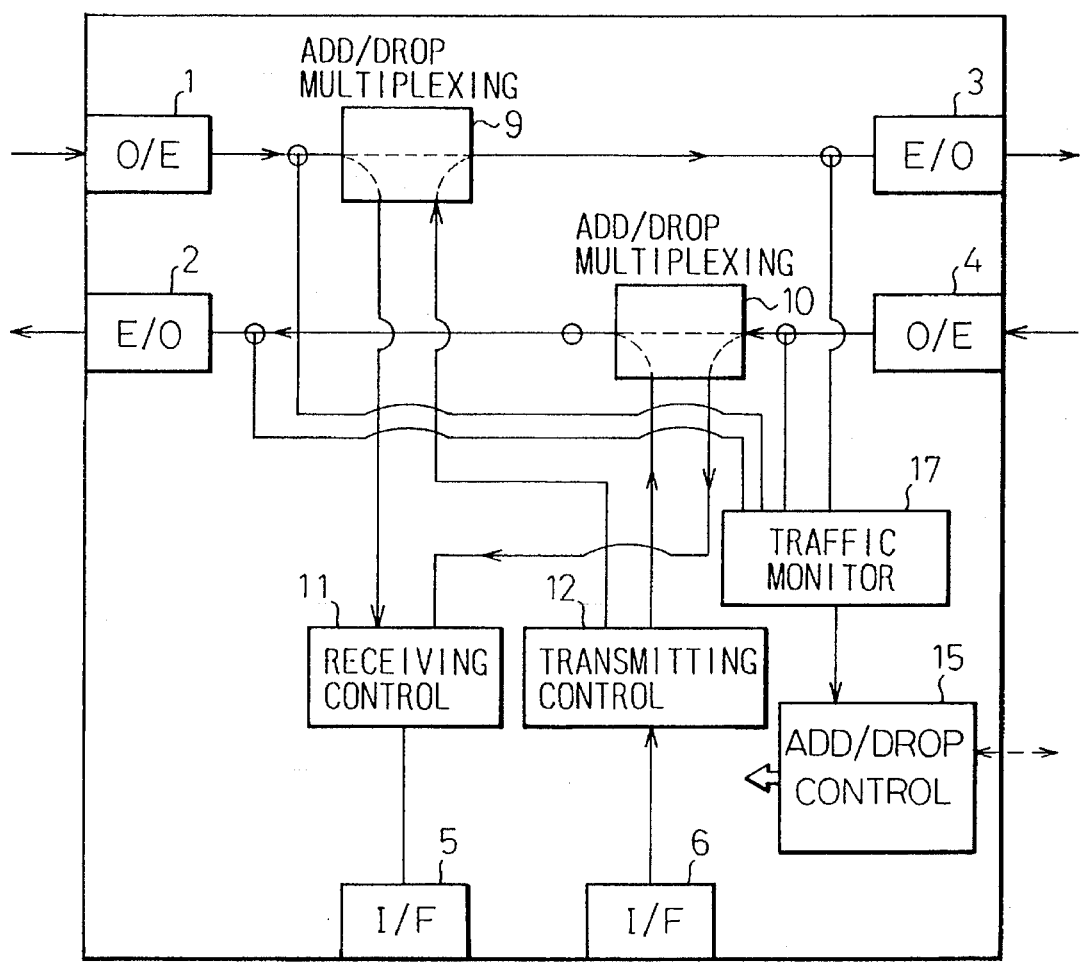
FIG. 27 is device block diagram which shows an embodiment of an SDH 2-fiber ring optical multiplexing device according to the present invention, in which a real-time bump-out change function is added to the embodiment of FIG. 7.

FIG. 27 shows the embodiment of FIG. 7 with the further addition of a real-time bump-out changing function.

In FIG. 27, the traffic in each of the time slots in the overall ring of the SDH 2-fiber ring is verified by, for example, monitoring the signaling by means of the traffic monitor 17, which is added to the configuration of FIG. 17, thereby enabling the real-time execution of changes in the priorities of each time slot. In addition, when a fault occurs bump-out is performed by the same procedure as was described for the case of FIG. 7, and other than the real-time changing of priorities, the switching procedure is also the same as in FIG. 7.

One approach to monitoring traffic is that of, for example, using $P_i$ as the priority of the i-th time slot in the overall ring, defining $P_i$ as the total of the amount of traffic at each link at time slot TS#i, and making the priority higher for higher values of $P_i$. However, the method of defining $P_i$ need not be limited to the above-noted method, and it is possible to multiply this by some coefficient, or to adopt some algorithm for its calculation.

Figure 28:
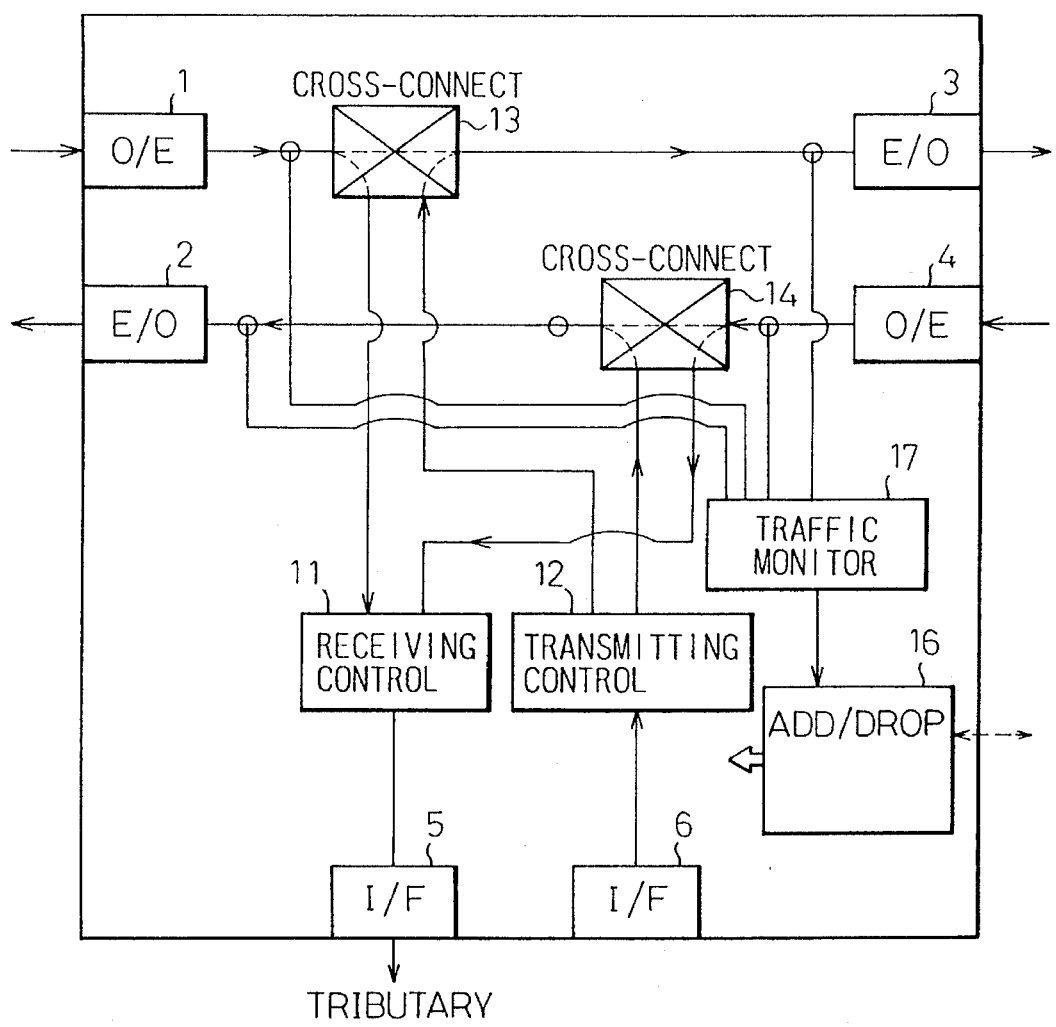
FIG. 28 is device block diagram which shows an embodiment of an SDH 2-fiber ring optical multiplexing device according to the present invention, in which a real-time bump-out change function is added to the embodiment of FIG. 16.

FIG. 28 shows the embodiment of FIG. 16 with the addition of a real-time bump-out change function.

In FIG. 28 the traffic in each of the time slots in the overall ring of the SDH 2-fiber ring is verified by, for example, monitoring the signaling by means of the traffic monitor 17, which is added to the configuration of FIG. 16, thereby enabling the real-time execution of changes in the priorities of each time slot. In addition, when a fault occurs bump-out is performed by the same procedure as was described for the case of FIG. 16, and other than the real-time changing of priorities, the switching procedure is also the same as in FIG. 16. The traffic (priorities) on both the M side and the S side for each node are controlled.

One approach to monitoring traffic is that of, for example, using Pi as the priority of the i-th time slot, defining Pi as the total of the amount of traffic at that link in time slot TS#i, and making the priority higher for higher values of Pi. However, the method of defining Pi need not be limited to the above-noted method, and it is possible to multiply this by some coefficient, or to adopt some algorithm for its calculation.

There are a number of methods of priority changing which can be devised.

First, there is the method of updating a priority table that each of the nodes has by means of performing periodic communications between each of the nodes. That is, the above-noted traffic monitor section 17 is used to monitor the traffic in each time slot of each node, and reporting the amount of traffic to all nodes in order to update the priority tables. For example, the amount of traffic could be reported to all nodes from each node in a prescribed node sequence ($N_1, N_2 \ldots, N_k$, or the like), at an interval of t seconds. This report can include, for example, the identification number of the issuing node and the amount of traffic for each time slot.

Second, there is the method of having each node monitor the traffic of each time slot at each node.

FIG. 29 shows one example of the above-noted traffic control table (corresponding to the priority table). In the example shown in FIG. 29, the priority sequence, following the amount of traffic sequence for each time slot, is TS#3>TS#1>TS#2>TS#N. The measurement of the amount of traffic is established as being performed on either the M or the S side of the ring, it being possible to use only the measurement values from a single side.

Third, there is the method of reporting the amount of traffic in each time slot to all nodes when there is a change in the traffic at each node.

Traffic control by this method is similar to that described above, except that the timing of the issuance of traffic reports is limited to times, for example, when the change in traffic exceeds a given allowable range, thereby enabling a reduction of the amount of data on the control channels. The method of traffic reporting can be similar to that described above, or can be a report of the amount of traffic for only the time slots that had a change in traffic.

Fourth, there is the method in which, after a fault is detected, a node issues a traffic report request to all nodes, the node with the detected fault then using the responses to that request to update a priority table.

Specifically, the node at which a fault is detected (node N1) issues a traffic report request to all the other nodes, each of the nodes then reporting to node N1 the amounts of traffic in each time slot. When node N1 receives these traffic reports, it updates the traffic control table (priority table). In this method, although as described above each node uses a table to control traffic, the data updating is only performed when a node detects a fault, and for that reason this method enables an even further reduction in the amount of data on the control channels.

According to present invention as described above, it is possible, as shown in FIG. 30, to reduce the number of protection time slots with respect to the number of working time slots, thereby enabling an increase in the usable bandwidth when the network is operating normally. FIG. 30 shows the case of three nodes (A, B, and C), 63 time slots, and the case in which the traffic is distributed uniformly among the nodes. The values in parentheses indicate the proportion of protected time slot with respect to the overall number of time slots (63).

Figure 31:
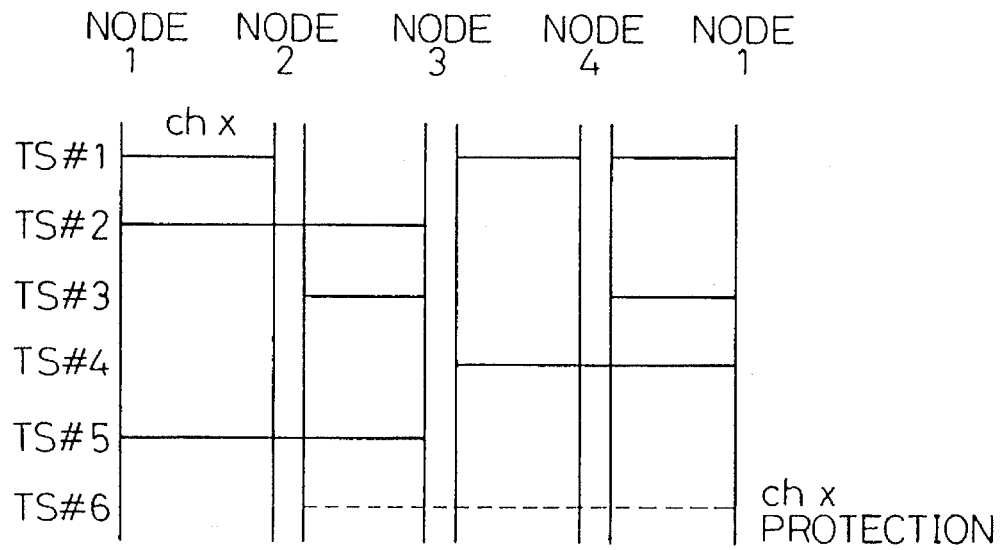
FIG. 31 is a drawing which illustrates an example of setting the protection channels on the overall ring network according to the present invention.
Figure 32:
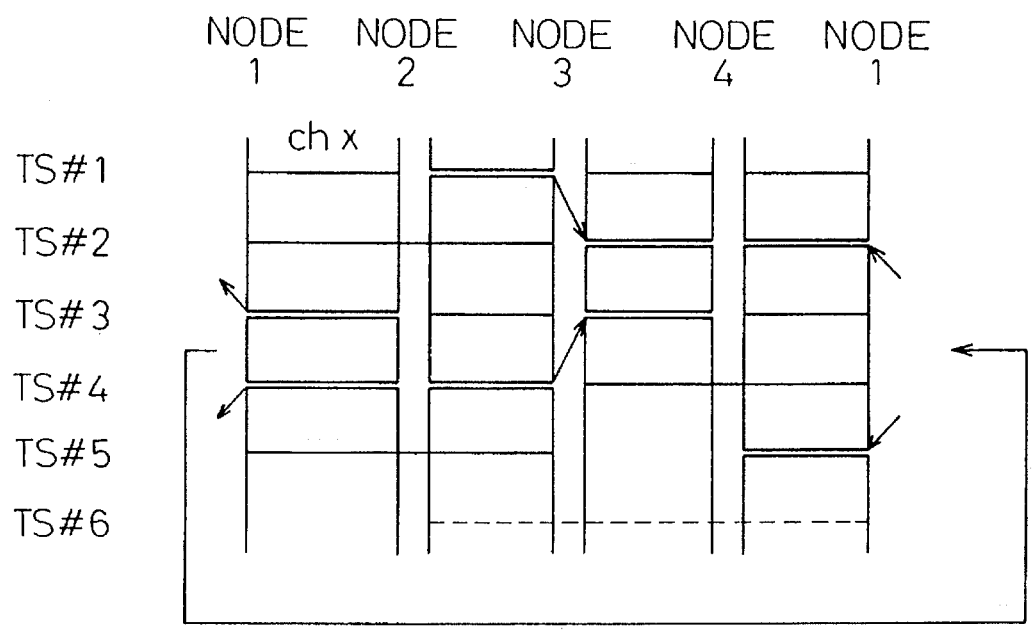
FIG. 32 is a drawing which illustrates an example of setting the protection channels between each node, using the cross connection function according to the present invention.

The cross-connect function according to the present invention functions effectively when channels are added in the case in which the ring becomes large or after repeated additions and removals of channels. For example, as shown in FIG. 31, in the case in which the protection channels are provided for the overall ring network and all time slots TS#1 to TS#6 are used, it is impossible to add a channel between node 2 and node 4. However, using the cross-connect function according to the present invention, as shown in FIG. 32, it is easy to add the new channels (either working or protection channels) indicated in the drawing by double lines.

In addition, using the bump-out function by means of priority assignments according to the present invention, it becomes possible in principle to use all time slots as working channels, thereby enabling a great increase in the usable bandwidth when the network is operating normally. This function can be easily implemented using the method of priority table updating according to the present invention.

What is claimed is:

1. An SDH 2-fiber ring optical multiplexing device, comprising:

a first opto-electrical converter which receives an optical signal from a first optical fiber transmission path which transmits signals in a given direction and converts said signal to an electrical signal;

a first channel operating section to which said signal from said first opto-electrical converter is applied and which performs the required operation with respect to the required channel signal of that signal;

a first electro-optical converter which converts a signal from said first channel operating section to an optical signal and outputs it to said first optical fiber transmission path;

a second opto-electrical converter which receives an optical signal from a second optical fiber transmission path which transmits signals in the direction opposite said given direction and converts said signal to an electrical signal;

a second channel operating section to which said signal from said second opto-electrical converter is applied, and which performs the required operation with respect to the required channel signal of said signal;

a second electro-optical converter which converts a signal from said second channel operating section to an optical signal and outputs it to said second optical fiber transmission path;

a receiving control section which performs channel signal receiving control with respect to said first channel operating section and said second channel operating section whereby control is performed as to which channel signal is to be received from either said first optical fiber transmission path or said second optical fiber transmission path;

a transmitting control section which performs channel signal transmitting control with respect to said first channel operating section and said second channel operating section whereby control is performed as to which channel signal is to be transmitted to either said first optical fiber transmission path or said second optical fiber transmission path to send the transmitted signal;

an output interface section which externally outputs signals received at said receiving control section; and an input interface section which applies externally input transmitted signal to said transmitting control section, wherein said receiving control section and transmitting control section, in performing the above-noted required receiving control and transmitting control, limit the number of protection channels with respect to the number of working channels by assigning a different number of protection channels on said first optical fiber transmission path and second optical fiber transmission path, thereby increasing the bandwidth usable when the network is operating normally.

2. An SDH 2-fiber ring optical multiplexing device according to claim 1, wherein said first channel operating section and said second channel operating section have a ADD/DROP function which inserts and extracts the required channel signal, thereby allocating differing numbers of protection channels in the overall ring network, so as to limit the number of protection channels with respect to the number of working channels.

3. An SDH 2-fiber ring optical multiplexing device according to claim 2, wherein said first channel operating section and said second channel operating section have a cross-connect function which alternately interchanges channels, thereby allocating differing numbers of protection channels with respect to between each node, so as to limit the number of protection channels with respect to the number of working channels.

4. An SDH 2-fiber ring network optical multiplexing device according to claim 3, wherein said time slots of each node on said ring network have assigned to them priorities, and wherein said first channel operating section and said second channel operating section and/or said receiving control section and said transmitting control section bump out low-priority time slots with high-priority time slots when a fault is detected, thereby protecting high-priority time slots with priority.

5. An SDH 2-fiber ring network optical multiplexing device according to claim 4, further comprising a priority control section which changes said priorities in real time by monitoring the traffic in each of said time slots between each said nodes.

6. An SDH 2-fiber ring network optical multiplexing device according to claim 5, wherein said priority control section updates a priority table for the purpose of changing said priorities by performing mutual periodic reporting, with other nodes, of the amount of traffic at each time slot between each node.

7. An SDH 2-fiber ring network optical multiplexing device according to claim 5, wherein said priority control section updates a priority table for the purpose of changing said priorities by performing mutual reporting with other nodes of the amount of traffic at each time slot between each node when the amount of traffic in said time slots changes by a given amount.

8. An SDH 2-fiber ring network optical multiplexing device according to claim 5, wherein said priority control section issues a traffic report request to all other nodes when a fault is detected, the resulting response being used as the basis for updating a priority table for the purpose of changing said priorities.

9. An SDH 2-fiber ring network optical multiplexing device according to claim 5, wherein said priority control section uses the SDH overhead bits to perform communications between each node.

10. An SDH 2-fiber ring network optical multiplexing device according to claim 5, wherein said priority control section uses a dedicated network to perform communications between each node.

11. An SDH 2-fiber ring network optical multiplexing device according to claim 2, wherein said time slots of each node on said ring network have assigned to them priorities in the network as a whole, and wherein said first channel operating section and said second channel operating section and/or said receiving control section and said transmitting control section bump out low-priority time slots with high-priority time slots when a fault is detected, thereby protecting high-priority time slots with priority.

12. An SDH 2-fiber ring network optical multiplexing device according to claim 11, further comprising a priority control section which changes said priorities in real time by monitoring the traffic in each of said time slots between each said nodes.

13. An SDH 2-fiber ring network optical multiplexing device according to claim 12, wherein said priority control section updates a priority table for the purpose of changing said priorities by performing mutual periodic reporting with other nodes of the amount of traffic at each time slot between each node.

14. An SDH 2-fiber ring network optical multiplexing device according to claim 13, wherein said priority control section updates a priority table for the purpose of changing said priorities by performing mutual reporting with other nodes of the amount of traffic at each time slot between each node when the amount of traffic in said time slots changes by a given amount.

15. An SDH 2-fiber ring network optical multiplexing device according to claim 12, wherein said priority control section issues a traffic report request to all other nodes when a fault is detected, the resulting response being used as the basis for updating a priority table for the purpose of changing said priorities.

16. An SDH 2-fiber ring network optical multiplexing device according to claim 12, wherein said priority control section uses the SDH overhead bits to perform communications between each node.

17. An SDH 2-fiber ring network optical multiplexing device according to claim 12, wherein said priority control section uses a dedicated network to perform communications between each node.

* * * * *